United States Patent Office 3,103,324
Patented Sept. 10, 1963

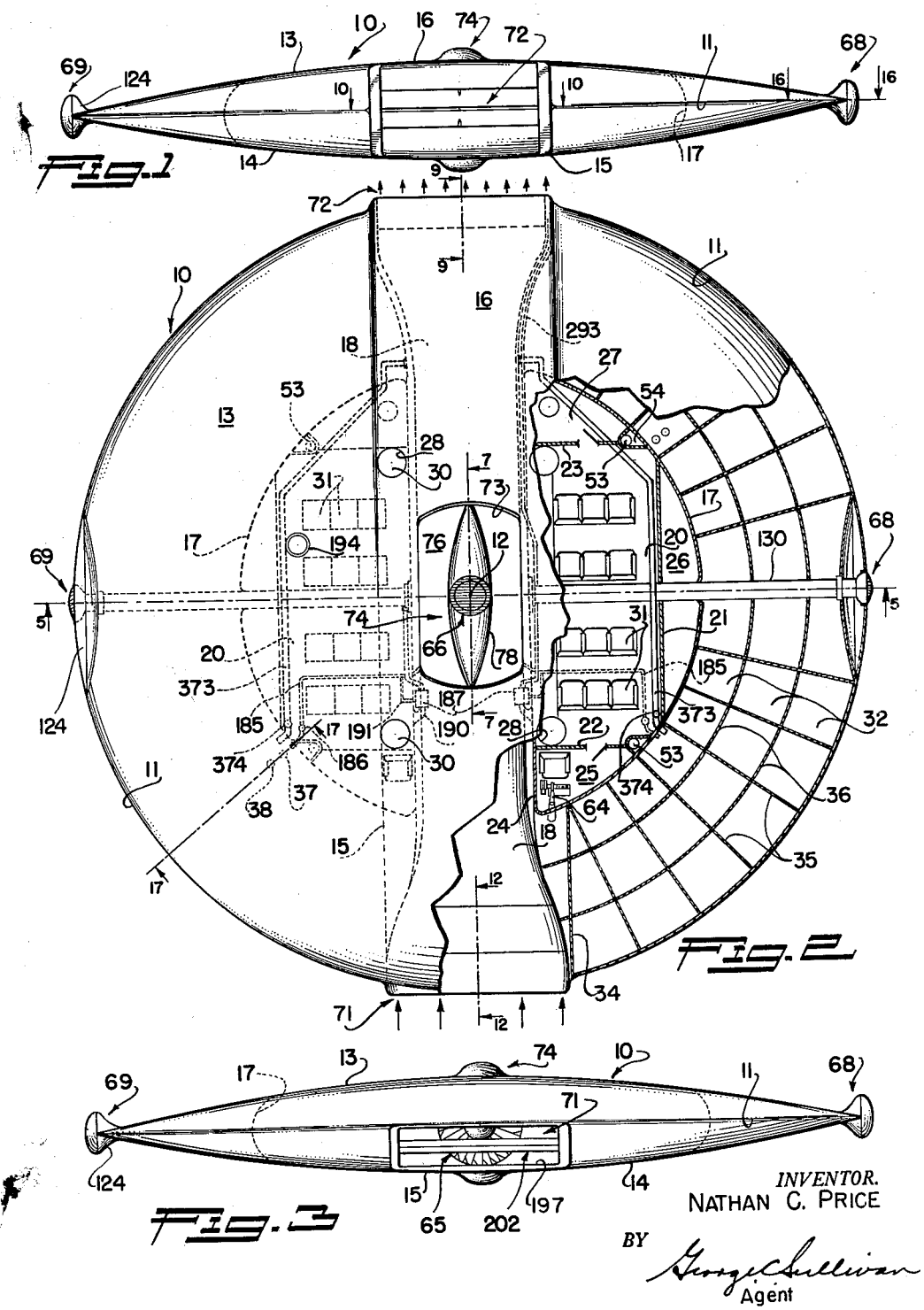

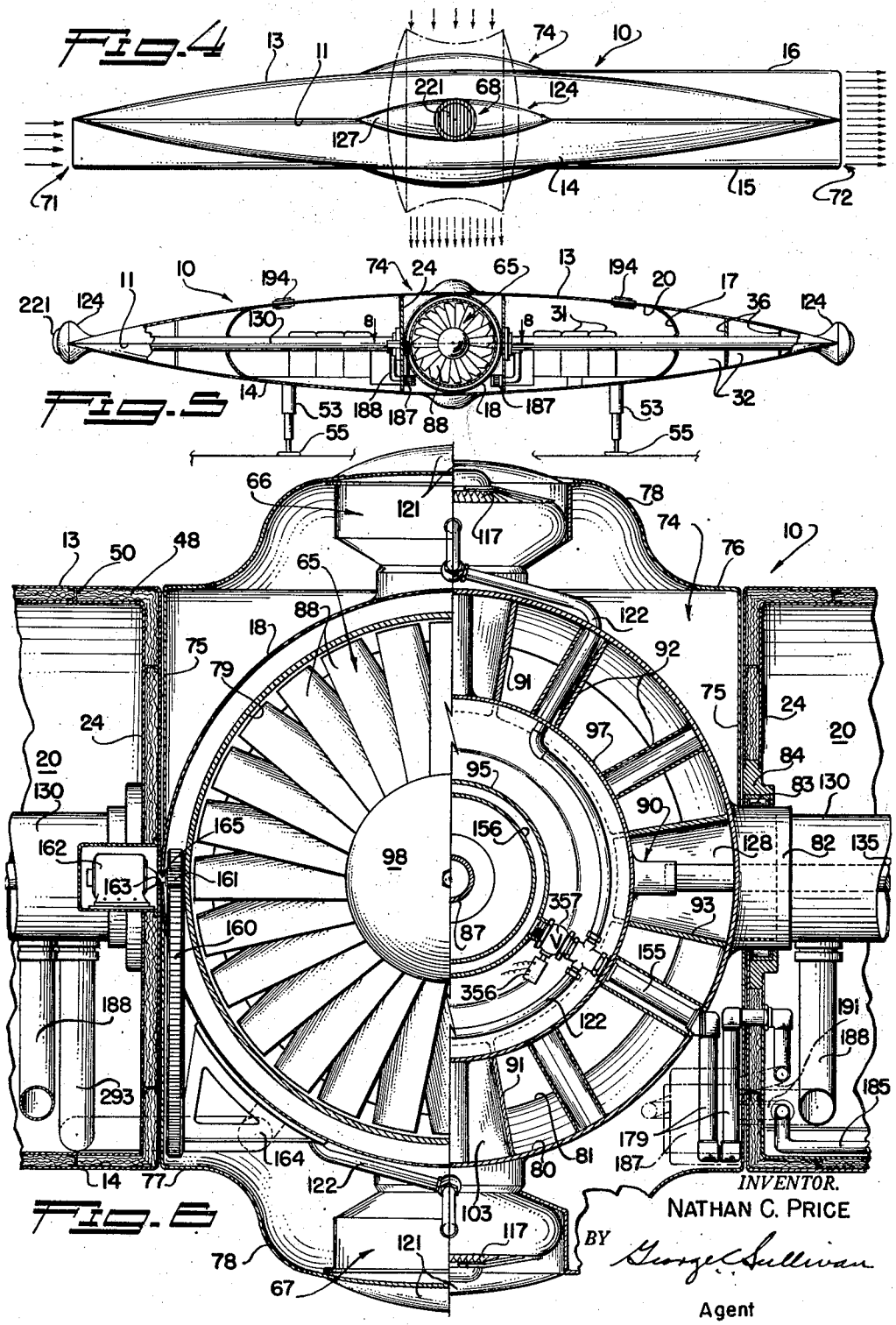

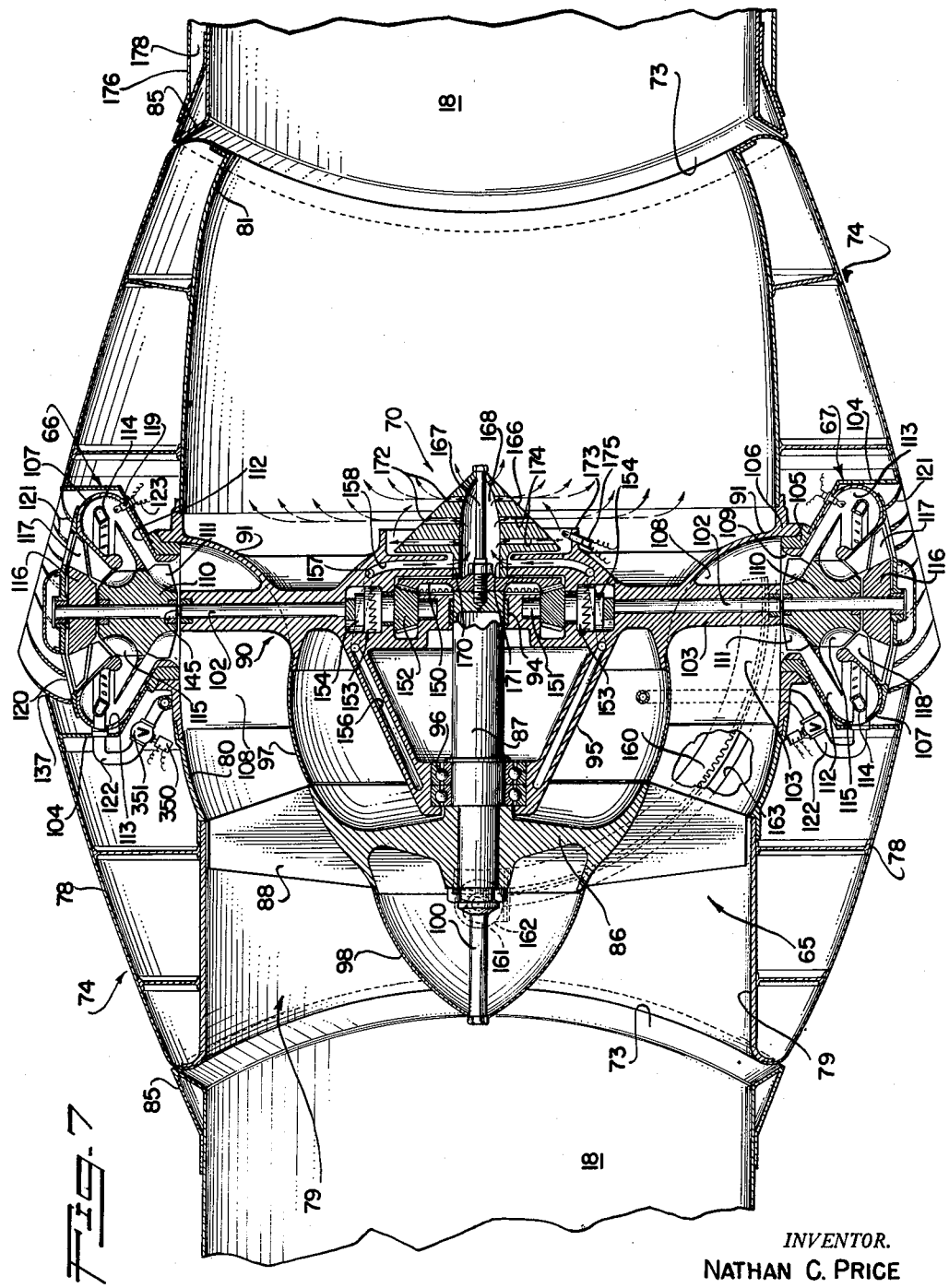

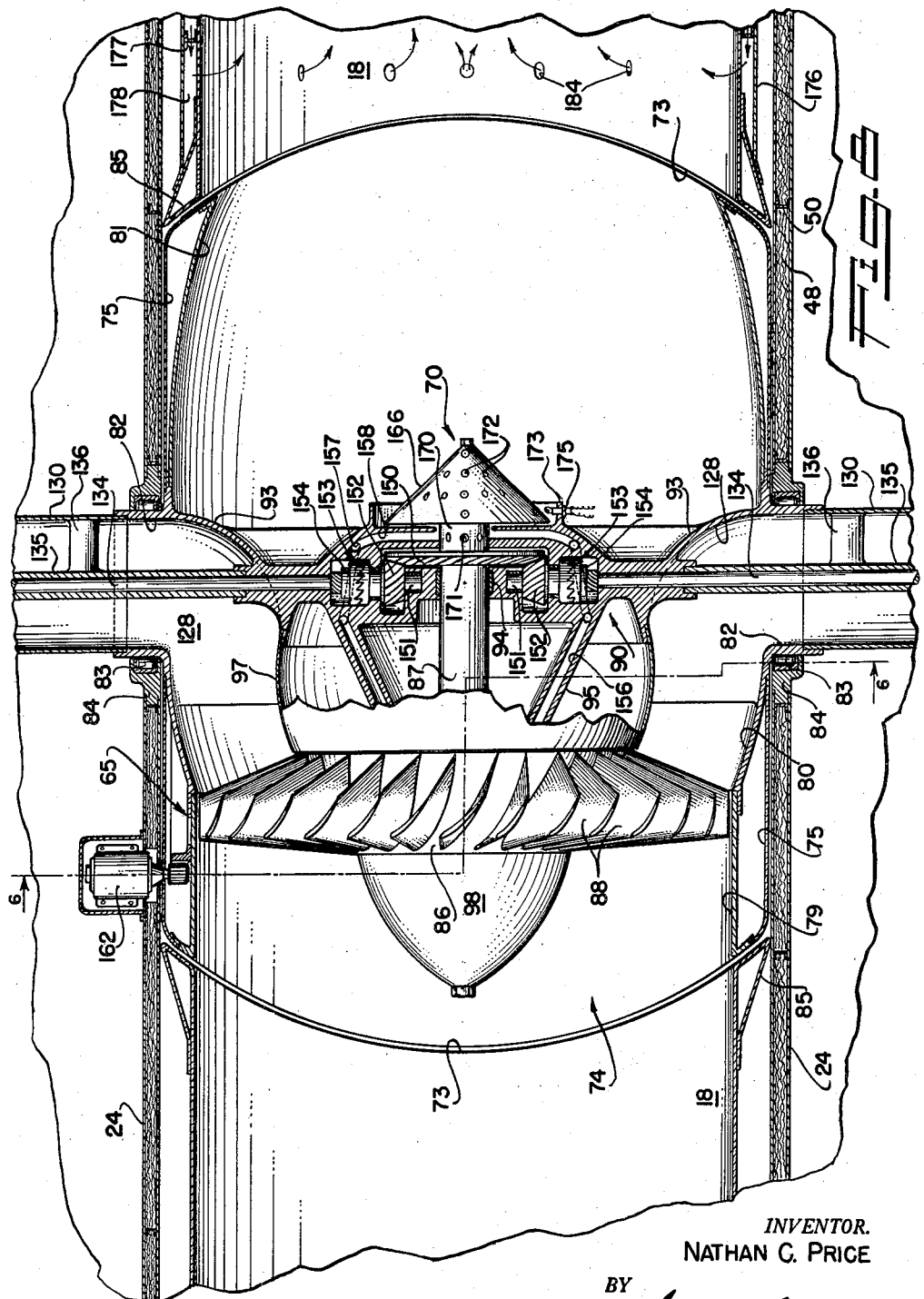

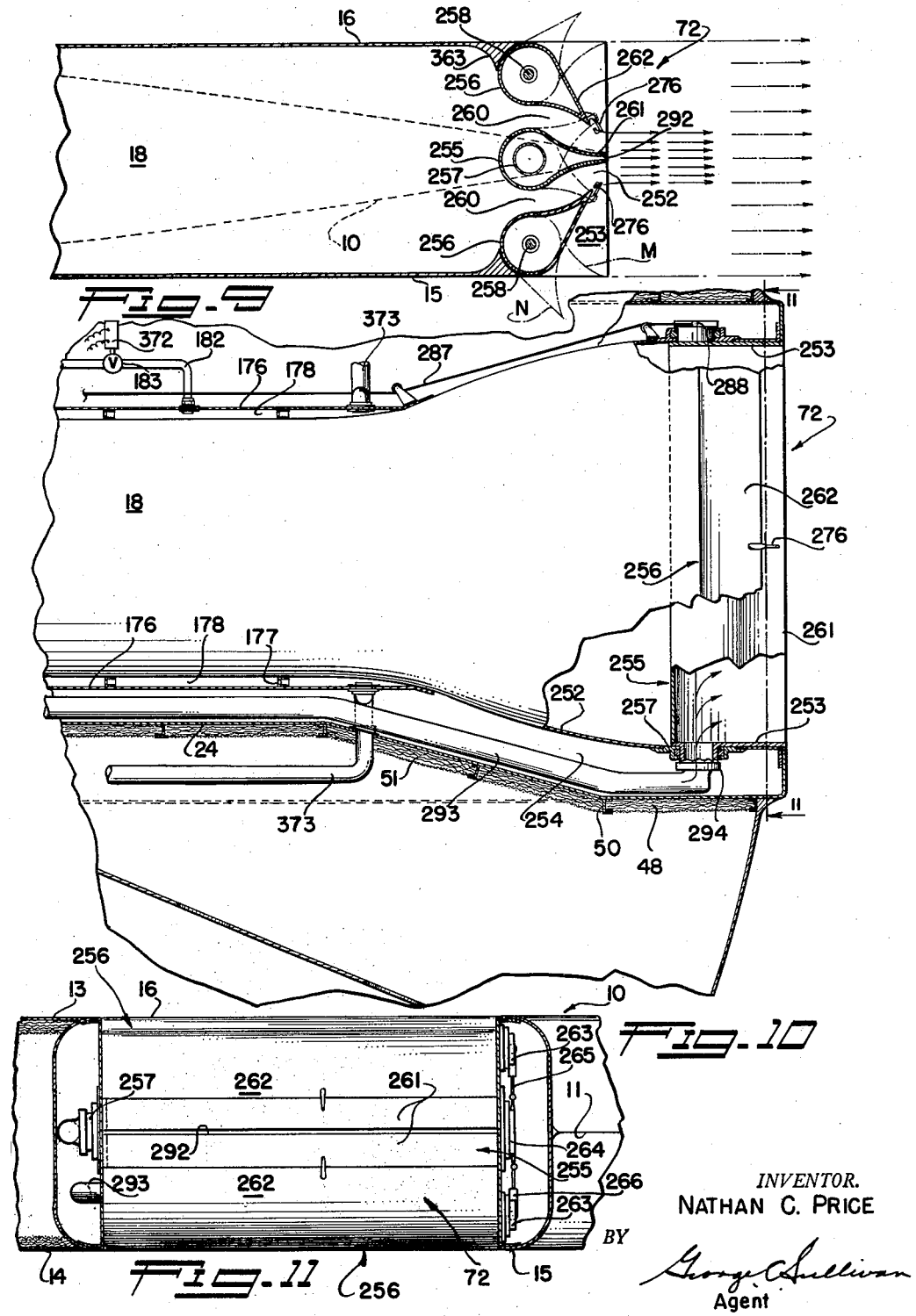

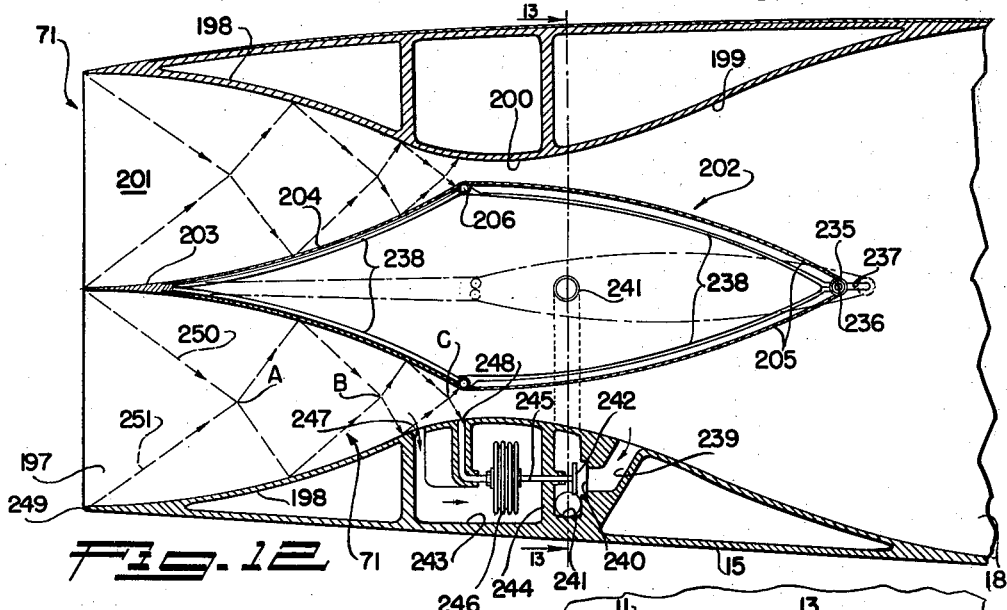

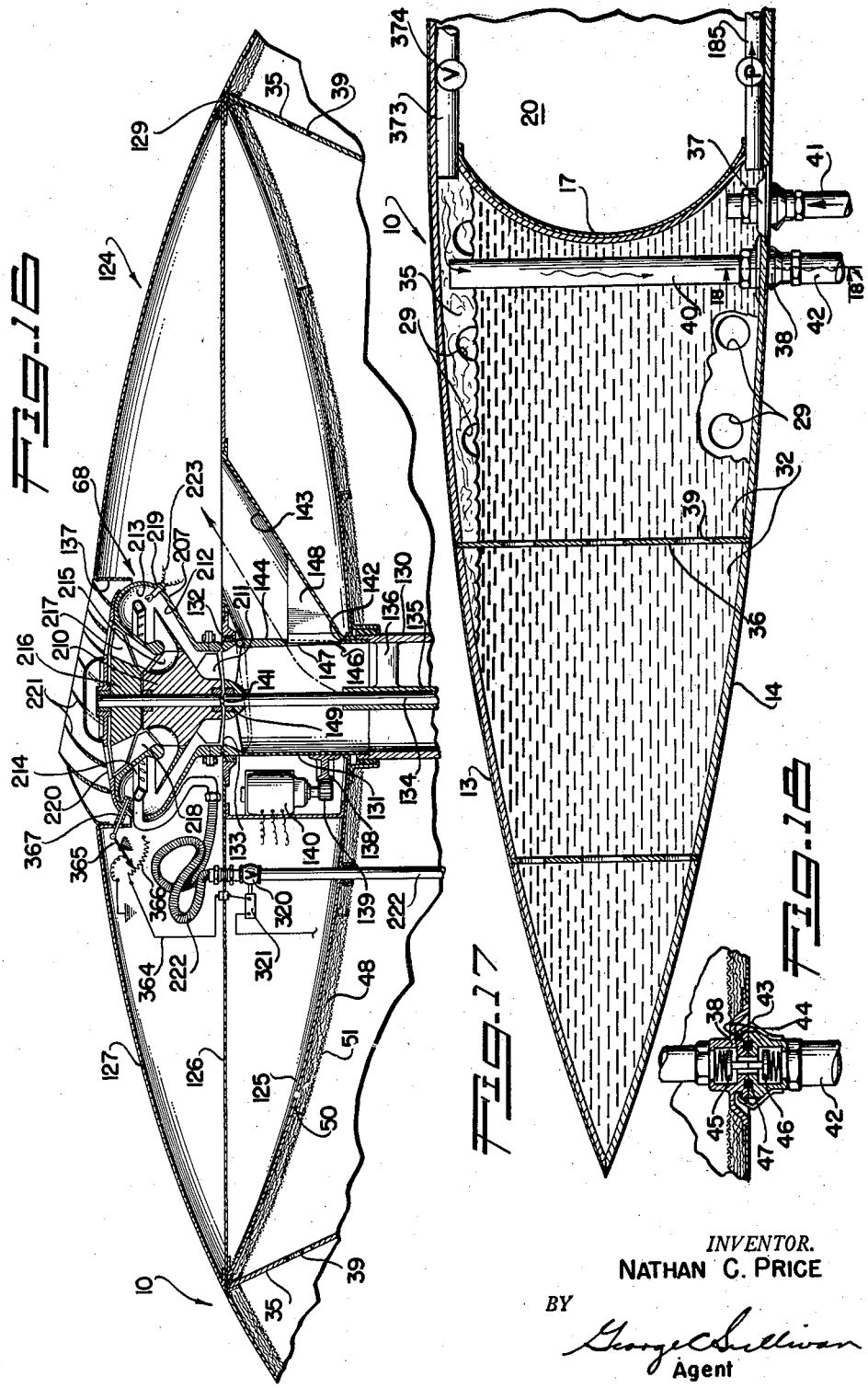

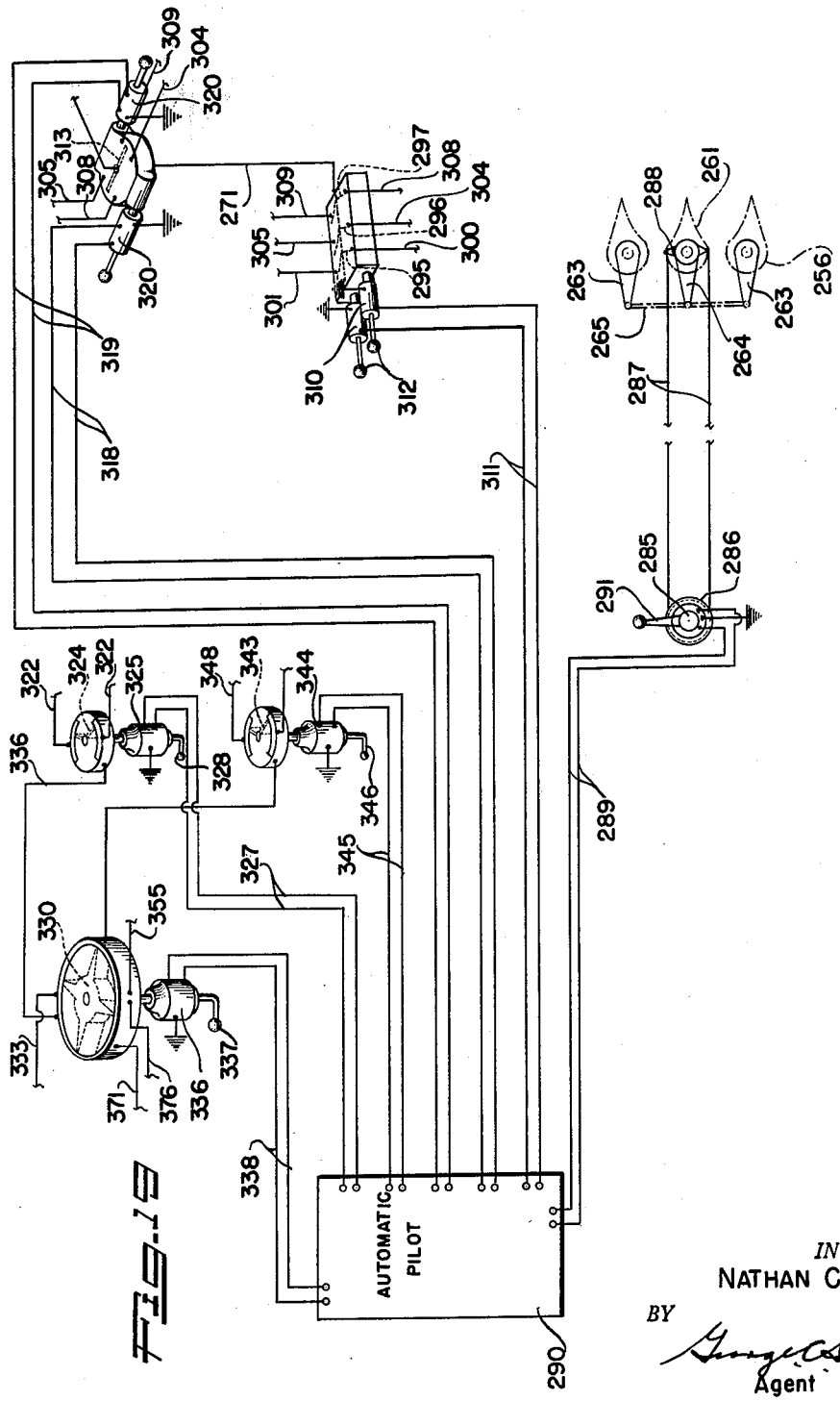

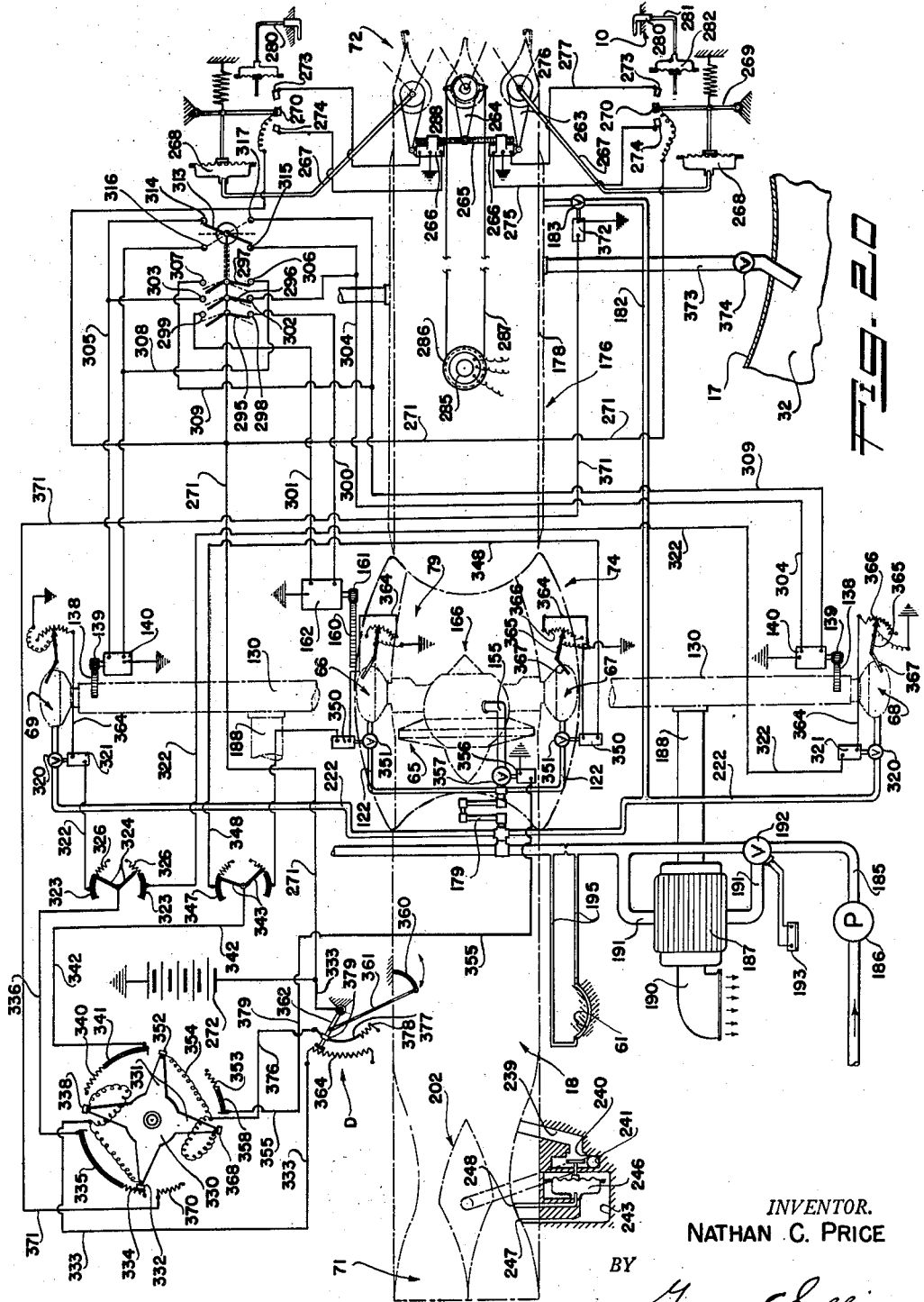

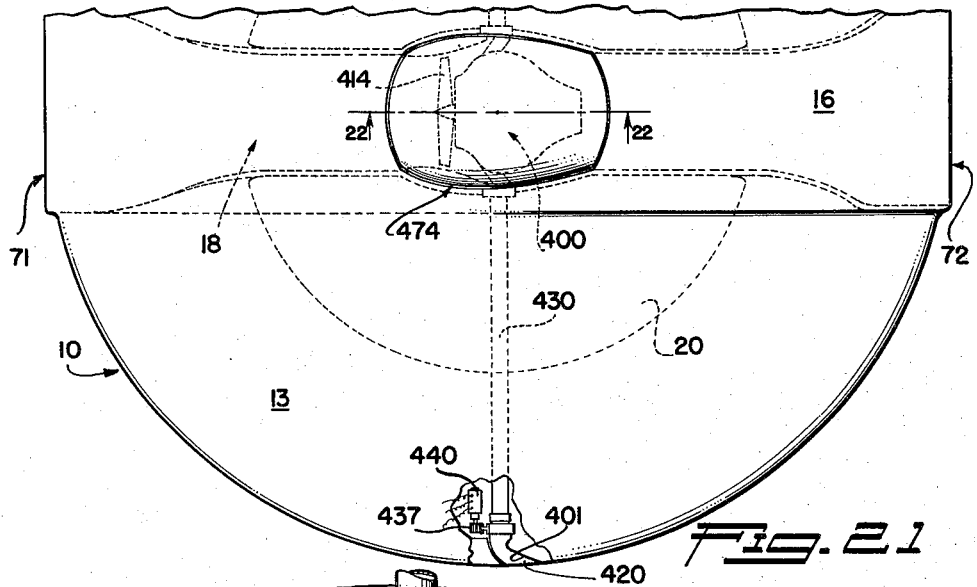

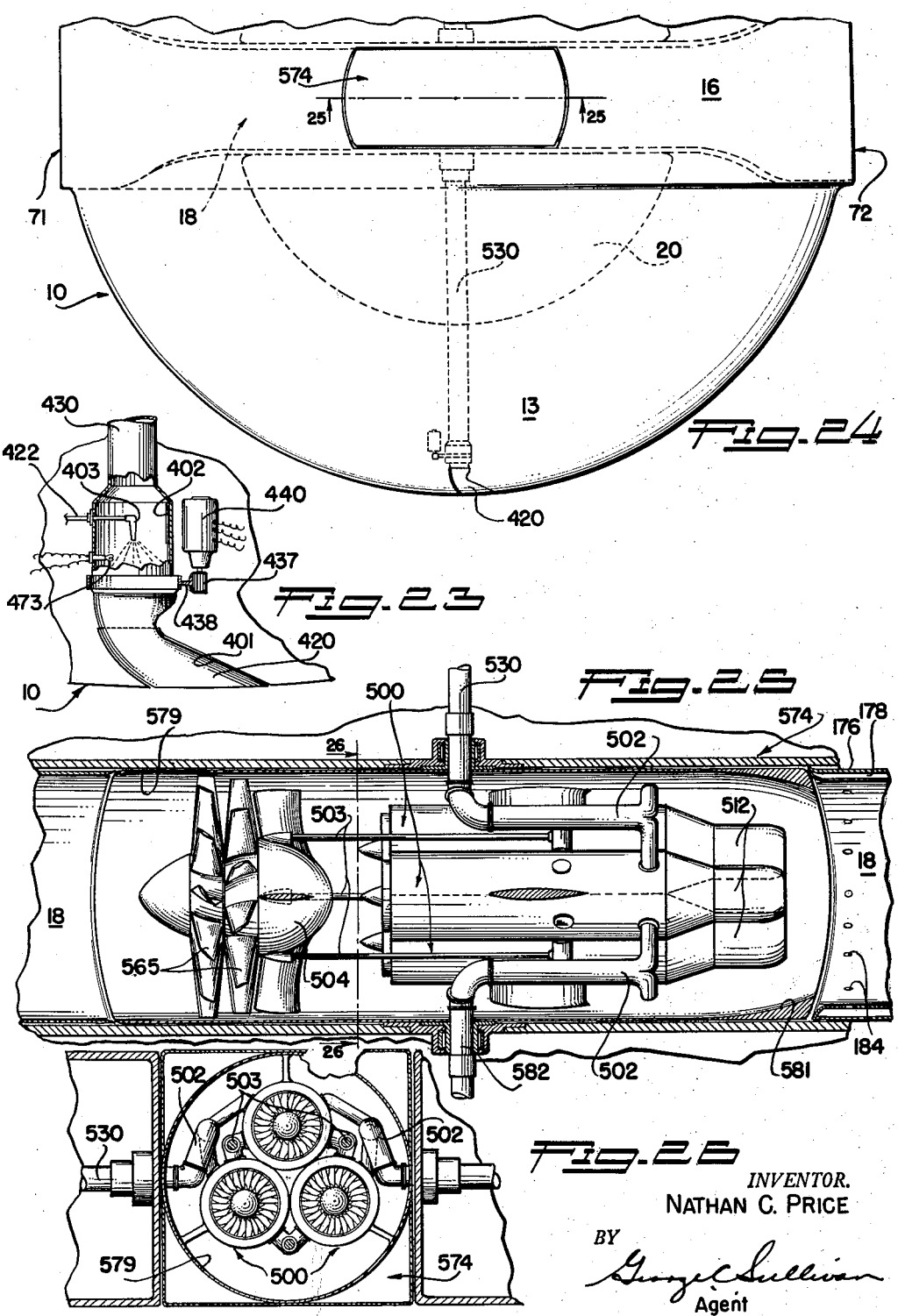

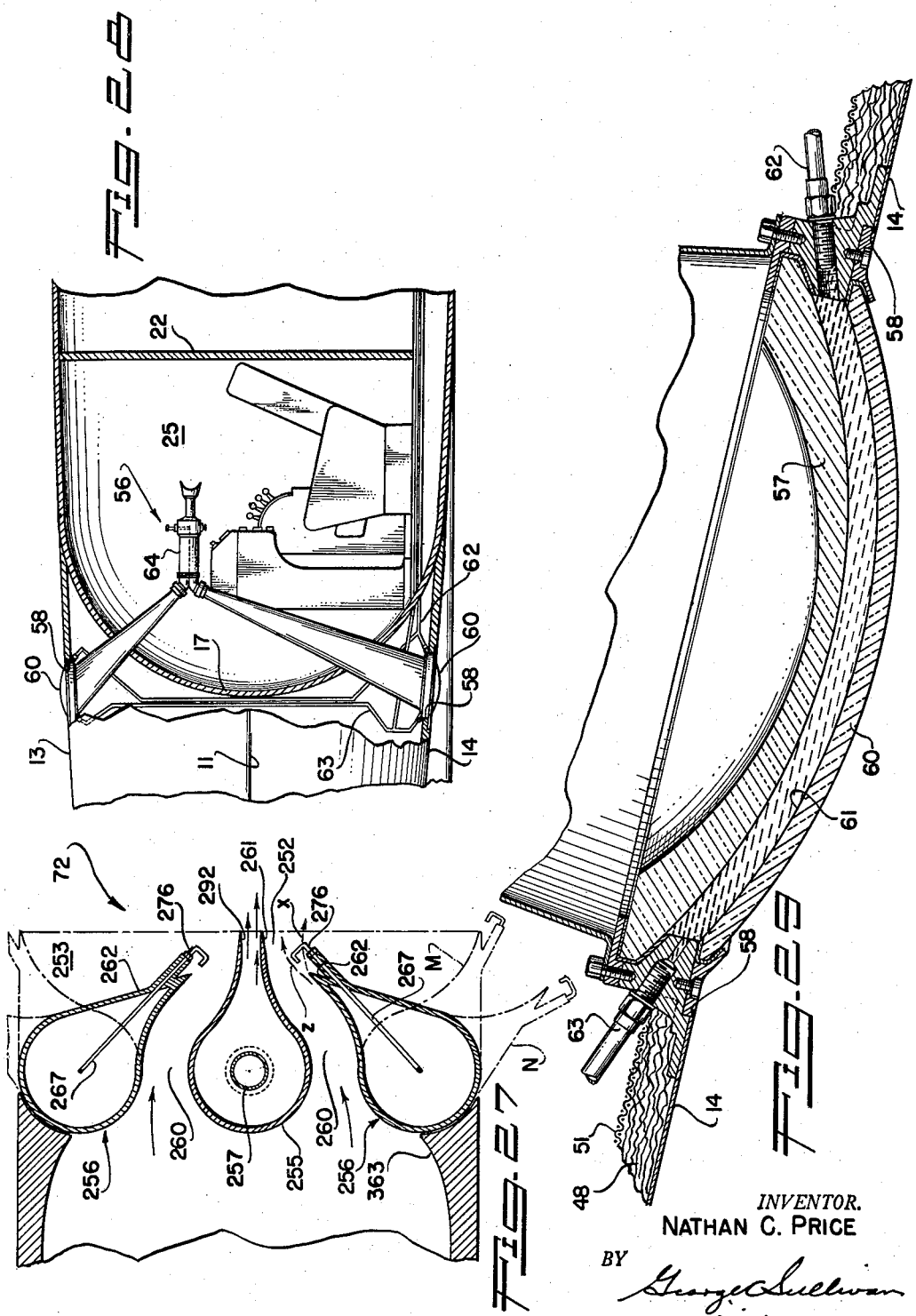

3,103,324
HIGH VELOCITY HIGH ALTITUDE
V.T.O.L. AIRCRAFT
Nathan C. Price, Hollywood, Calif., assignor to Lockheed Aircraft Corporation, Burbank, Calif.
Filed Jan. 23, 1953, Ser. No. 332,957
29 Claims. (Cl. 244—12)

This invention relates to aircraft, and relates more particularly to aircraft capable of vertical ascent and descent during take-off and landing and of high altitude flight at supersonic velocities. It is a general object of the invention to provide vertical rising and descending aircraft characterized by their unique aerodynamically efficient design and by propelling, refrigerating and control systems for producing safe, efficient, supersonic, long range flight. The aircraft of the invention is designed not only for vertical ascent and descent to facilitate landing and taking off at small fields or landing areas but also for long range flight at a Mach number of, say, 4, and at altitudes in the region of 100,000 ft.

Another object of the invention is to provide aircraft of circular plan-form and of bi-convex vertical cross section which may be devoid of the conventional fuselage, wings, and empennage. The circular plan-form airplane of the invention has spheric convex upper and lower skin surfaces constituting the major surface areas of the airplane. This simple structure or design has many inherent advantages and features. It:

(1) Is an inherently rigid, strong structure having greater resistance to bending and torsional moments than other airborne configurations;
(2) Provides for a more uniform weight distribution over the lifting surface than other aircraft configurations;
(3) Allows a more uniform distribution of landing forces into the airplane structure and due to its circular plan-form permits the employment of any selected or required number of landing struts;
(4) Is not subject to flutter or to damage by gusts;
(5) Is structurally efficient in containing internal cabin pressures, fuel and other internal loads by reason of the spherical convex upper and lower skin surfaces joined one to the other at the circular periphery of the craft;
(6) Operates to effectively or uniformly distribute the thermal stresses and deformations resulting from high Mach number flight;
(7) Permits the positioning or concentrating of the useful loads in concentric relation to the center of gravity and geometric center of the structure and the disposition of the fuel loads in balanced or concentric relation to the center of gravity and geometric center;
(8) Is stable during vertical ascent and descent due to its circular plan-form;
(9) Provides a maximum volumetric capacity for the pay loads and fuel;
(10) Is simple and inexpensive to construct owing to its simple regular configuration and because many of its parts may be of like or identical size and shape;
(11) Occupies a minimum of field or floor space when not in flight due to its inherent compactness;
(12) Is inherently aerodynamically efficient, having a good $L/D$ ratio and present a substantially continuous unbroken peripheral edge (leading and trailing edges) and a smooth profile offering a minimum of skin friction drag; and
(13) May land and take off from any medium, being stable even on rough water.

These and other considerations and advantages all result from the simple compact circular plan-form airframe of bi-convex cross section.

Another object of the invention is to provide an aircraft of this character having a diametrically extending thin plate airfoil region or portion containing in part the primary propulsive mechanism or means, this thin plate airfoil constituting only a relatively small portion of the total airfoil and yet assisting in producing aerodynamic lift with a minimum of drag.

Another and important object of the invention is to provide a novel, effective and dependable refrigerating system for an aircraft of the kind mentioned, which utilizes the propulsive fuel as a refrigerant. As is well known, operation of an aircraft at supersonic velocities is accompanied by aerodynamically induced skin temperatures that are so high or excessive as to endanger the structural integrity of the aircraft and to make it untenable for the personnel and passengers. For example, the heat input to the skin of the airplane of this invention having a diameter of 50 ft. flying at a Mach number of 4 and an altitude of 100,000 ft. will be in the neighborhood of 28 million B.t.u.'s per hour, resulting in a skin temperature approaching 1140° F., disregarding solar radiation which is of no material consequence in the case of this aircraft. Present day aircraft cooling systems are wholly inadequate to cope with temperatures of this magnitude and such temperatures would endanger the internal structure and make human occupation of the aircraft impossible. With the fuel storage cooling system of the invention the skin temperatures at such speeds and altitudes are reduced to a level where a skin formed of stainless steel, or comparable material, maintains adequate strength characteristics and the invention utilizes the fuel as a refrigerant to maintain the temperature of the cabin or passenger and cargo compartments at levels where passenger comfort is assured. To further reduce the temperature of the skin the surface of the latter is treated chemically or coated to impart a high emissivity of radiant heat. The reduction in skin temperature substantially reduces the skin frictional drag because the viscosity of the boundary layer air is proportionately reduced. Furthermore, the fuel-refrigerant is employed to cool the regions or portions of the propulsive mechanisms, etc. embodying bearings, shafts, rotors, gearing, and the like, which might be adversely affected by high temperatures.

Another object of the invention is to provide an aircraft of the character above referred to which employs a low boiling point fuel, such as butane or propane as the fuel and refrigerant. Such fuels have approximately 15% more energy value than conventional aircraft fuels but are much less dense, thereby requiring considerably greater tank space or volume. The circular plan-form bi-convex airplane of the invention supplies this necessary fuel storage volume and contains the low boiling point fuel in such a manner that it effectively cools the skin and assists in protecting the passenger and cargo compartments against excessively high temperatures. The low boiling point fuel through vaporization of even only one third of the total fuel carried absorbes in the neighborhood of 1 million B.t.u. per hour, thereby bringing the skin temperatures into equilibrium at a substantially lower value. Thus the configuration of the airframe or body and the type of propulsive fuel and its mode of storage mutually contribute to the cooling of the skin and provide storage regions of ample volume for the low density fuel. It is of primary importance that the invention effectively utilizes the low boiling fuel as a refrigerant for cooling the air supplied to the passenger and cargo compartments and for cooling the rotors, bearings, and other critical mechanisms.

Another object of the invention is to provide a fuel system and cooling system for this type of aircraft wherein the fuel or a portion thereof is vaporized in an annular vaporizer around the high temperature tail pipe or ram jet combustion zone to protect the structure thereof and to vaporize the fuel and also where the heat energy absorbed by the fuel at the skin, at the cabin air cooler, at the vaporizer and at the mechanism-cooling regions is recovered by the fuel and utilized to assist in propelling the aircraft, there being a regenerative action or effect in the fuel-cooling system.

Another object of the invention is to provide a propulsive system for aircraft of the class herein described that is emminently well adapted for the flight program or flight sequence of the craft. The propulsive system incorporates elements or instrumentalities for efficiently producing the vertical or substantially vertical ascent and descent of the craft, flight to and from the high altitude high velocity level flight region of the program and the propulsion of the craft in this region at multi-Mach number velocities.

Another object of the invention is to provide a vertical rising and descending aircraft operable at high velocities at relatively high altitudes incorporating a propulsive method and system characterized by their versatility and ability to function in different manners in the distinct regions or portions of the flight program to assure the most efficient propulsion sequence. During vertical ascent and descent for take-off and landing the craft is propelled or operated by a ducted compressor with an afterburner producing a vertical propulsive jet, the compressor being driven by what I will term "load turbines." These load turbines are turbo jet powerplants supercharged by the ducted compressor and their propulsive jets together with the jet from the ducted compressor and afterburner may be directionally controlled for the purpose of trimming the craft. Upon becoming airborne and in flying from adjacent the ground level to an altitude of, say, 50,000 ft., the flight path angle is from 10 to 20° and the ducted compressor operates without its afterburner but is assisted by the jets from its load turbines to propel the aircraft at subsonic velocities. In approaching and accelerating through the transonic speed range and in thereafter accelerating and climbing to the selected level flight altitude of, say, 100,000 ft., the afterburner is employed to provide additional thrust. Upon reaching this selected altitude and obtaining a suitable supersonic velocity the propulsive system operates as a pure ram jet, the ducted compressor blading merely windmilling and the ram jet action serving as the sole propulsive force assisted only by the air jets from the nozzles of the load turbines which are primarily employed at this time as trimming and directional control devices. The self-same ducts which serve to carry the ducted compressor air and its propulsive jet also serve as a duct for the ram jet, the variable area ram inlet and the variable area propulsive nozzle of the duct operating during the subsonic, transonic and supersonic phases of the flight, that is during ducted compressor operation stages and ram jet operation stages. Thus this propulsive apparatus operates as a ducted compressor propulsive device during low and moderate elevation operations at subsonic and transonic speeds where this type of propulsion is effective and efficient and as a ram jet at the higher altitudes and multi-Mach number velocities where ram jet propulsion is more practical and more efficient.

Another object of the invention is to provide a vertical rising high velocity aircraft of the type referred to above wherein the ducted compressor and a portion of its duct are movable through an angle of 90° or more so that the compressor may direct its propulsive jet or stream in the vertical or substantially vertical direction from the underside of the circular plan-form airplane for vertical and substantially vertical rising and descent and in a generally horizontal direction through the main duct and propulsive nozzle of the craft for generally horizontal flight. The compressor and the fuel injector means of its afterburner are within a duct section which may be termed an "island" and this island is rotatable about a spanwise axis which may preferably intersect the center of gravity and the geometric center of the craft, the island being movable in a vertical opening in the circular plan-form body so as to swing to its various operative positions. When in the normal generally horizontal position the island duct is in register with the main duct which occupies the above-mentioned thin plate airfoil of the body and the island surfaces are flush with and form parts of the aircraft skin so as to offer a minimum of aerodynamic drag.

Another object is to provide aircraft of this kind having a safe dependable propulsive system wherein operational failure of certain of its components will not endanger the craft or its occupants. The load turbines which incorporate the high velocity rotors of the system are so positioned that the planes of rotation of these rotors do not in any instance intersect the passenger compartment or vital portions of the craft while in translational flight. Accordingly, failure or bursting of a rotor will not endanger the occupants of the craft and provision is made for freeing or jettisoning failed load turbines in such a manner that the overall cooperation of the propulsive system and directional control features are affected to a minimum extent.

Another object is to provide an aircraft of this kind wherein the ram inlet and propulsive nozzle of the main propulsive duct are automatically controlled in response to the flight velocity, and local Mach numbers adjacent thereto, etc. to assure the most efficient and effective propulsion action.

Another object is to provide an aircraft of the type described having a novel supersonic variable ram inlet automatically operating in response to flight speed and/or flow conditions to be most effective at both subsonic and supersonic speeds. During subsonic air flow into the ram the inlet or throat is open to the maximum extent, or uncontracted, whereas at supersonic speeds the throat is automatically contracted to a greater or lesser extent, to obtain the most efficient supersonic diffuser action.

Another object is to provide an aircraft of the kind described incorporating a specialized jet outlet or nozzle for the main propulsive duct that is automatically operated to provide the most efficient propulsive jet at supersonic jet velocities and at subsonic jet speeds; that is adapted to change the direction of the jet to obtain a trimming action for the craft; and that may be operated to serve as an air brake to lessen flight velocity. The multi-purpose nozzle has movable flow controlling members operable to various relative positions to effect these purposes and at least one of them discharges a stream or jet of compressed air to facilitate and augment the pitch control or pitch trimming of the craft.

Another object of the invention is to provide an aircraft of this kind wherein the variable inlet and the controllable outlet or nozzle of the main duct are generally rectangular and are elongated spanwise of the circular craft to best conform with its thin periphery. The elongated inlet and outlet cause or contribute to the desirable thin central airfoil region and reduce wake losses. The main propulsive duct is diametric of the circular airfoil or body so that there is ample length for the propulsive mechanism in the circumference of the body and therefore no need to extend or project either the ram inlet or the nozzle from the periphery of the circular craft.

Another object is to provide a high speed aircraft of the class described wherein the propulsive devices are employed to obtain directional control. As already noted the island containing the ducted propulsive compressor is turnable about an axis at the geometric center of the circular craft to produce vertical lift during ascent and descent and to propel or operate the craft at steep climb and descent angles. In addition there are outboard load turbines at the lateral edges or "span" extremities of the circular body assisting in driving the ducted compressor. These outboard turbines have propulsive jet discharging nozzles or outlets arranged for independent angular movement and adjustable or operable to direct their propulsive streams in various directions to obtain or produce directional control for the craft. In the event of failure and jettisoning or detachment of one or both of these outboard turbines, compressed air from the main propulsive duct continues to discharge from directional nozzles that are movable to obtain or preserve the directional control. In accordance with the invention the propulsive means and elements associated therewith are utilized to produce the directional control and trimming forces making unnecessary control surfaces of the conventional types. Furthermore, as the circular plan-form body is inherently stable, stabilizers of the conventional types are not needed although the margins of the central diametric portion, containing in part the main duct, serve as vertical stabilizing surfaces and the pods containing the outboard load turbines act as tip shields to reduce vortices losses. Thus except for the said diametric rib region and tip pods the craft is substantially symmetrical, constituting an aerodynamically efficient circular plan-form with spherically convex upper and lower surfaces.

Another object of the invention is to provide a novel, effective fueling system for supplying the fuel compartments or tanks of the craft with the low boiling point fuel. The system is such that during the fueling operation and until actual takeoff of the craft, liquid fuel is pumped into the compartments and the vaporized fuel is continuously returned or drawn off from the compartments, the conduits or lines handling the liquid fuel and vapor being automatically disconnected when the craft leaves the ground.

A further object is to provide a circular plan-form aircraft as described characterized by the by-convex skin surfaces capable of carrying substantial internal pressures and be simple yet strong and effective passenger, cargo and fuel compartmentation. The cabin is surrounded by a circular wall or bulkhead extending between the upper and lower convex skin structures, this bulkhead together with the skin structures providing or constituting the fuel tanks or compartments and there are circumferentially spaced radial baffles in the fuel compartments secured to the skins and the circular bulkhead. This internal structure, including, of course, minor local stiffening ribs, etc., is so strong and rigid as to readily withstand all aerodynamically induced vibration forces as well as all other operational loads and forces.

Other objectives and features will become apparent from the following detailed description of typical preferred embodiments of the invention throughout which reference will be made to the accompanying drawings, wherein:

FIGURE 1 is a rear elevational view of an aircraft of the invention;

FIGURE 2 is a plan view of the aircraft with a portion broken away to illustrate the internal structure;

FIGURE 3 is a front elevation of the craft;

FIGURE 4 is an edge or side elevation of the craft with broken lines illustrating the island in a vertical position to produce vertical thrust for ascent or descent;

FIGURE 5 is a transverse sectional view taken substantially as indicated by line 5—5 on FIGURE 2 and illustrating the landing struts and the tip portions is elevation;

FIGURE 6 is an enlarged fragmentary vertical sectional view of the island and adjacent portions being a view taken substantially as indicated by line 6—6 on FIGURE 8;

FIGURE 7 is an enlarged fragmentary vertical sectional view of the island and adjacent portions taken as indicated by line 7—7 on FIGURE 2;

FIGURE 8 is an enlarged horizontal fragmentary sectional view taken substantially as indicated by line 8—8 on FIGURE 5, with certain portions appearing in elevation;

FIGURE 9 is an enlarged fragmentary vertical sectional view through the main propulsive nozzle taken substantially as indicated by line 9—9 on FIGURE 2 with broken lines indicating various positions of the nozzle members;

FIGURE 10 is an enlarged horizontal detailed sectional view of the nozzle taken substantially as indicated by line 10—10 on FIGURE 1 with certain of the nozzle parts appearing in elevation;

FIGURE 11 is a view taken substantially as indicated by line 11—11 on FIGURE 10 showing the nozzle members in elevation and adjacent parts in vertical cross section;

FIGURE 12 is an enlarged vertical sectional view of the ram inlet portion of the main propulsive jet being a view taken as indicated by line 12—12 on FIGURE 2 with the broken lines and arrows illustrating the shock waves and reflected shock waves;

FIGURE 13 is a fragmentary vertical sectional view taken as indicated by line 13—13 on FIGURE 12;

FIGURE 14 is an enlarged detailed sectional view of the insulating means as employed on the skin and bulkhead portions;

FIGURE 15 is an enlarged fragmentary perspective view of a portion of the insulating assembly with the parts separated;

FIGURE 16 is an enlarged fragmentary horizontal sectional view taken as indicated by line 16—16 on FIGURE 1 illustrating one of the outboard load turbines and adjacent equipment;

FIGURE 17 is an enlarged fragmentary vertical sectional view taken as indicated by lines 17—17 on FIGURE 2 showing one of the fuel compartments and a portion of the fueling means;

FIGURE 18 is an enlarged fragmentary sectional view taken as indicated by line 18—18 on FIGURE 17;

FIGURE 19 is a wiring diagram of the circuits and equipment controlled by the automatic pilot;

FIGURE 20 is a schematic diagram of the electrical circuits, the pneumatic system and the fuel-refrigerating system and other elements of the airplane;

FIGURE 21 is a fragmentary plan view of another aircraft of the invention with a portion broken away to illustrate one of the tip nozzles;

FIGURE 22 is an enlarged fragmentary vertical sectional view taken as indicated by line 22—22 on FIGURE 21;

FIGURE 23 is an enlarged fragmentary horizontal sectional view illustrating one of the variable direction control nozzles and combustion chamber units of the airplane shown in FIGURES 21 and 24;

FIGURE 24 is a plan elevation of another aircraft of the invention employing a multiplicity of turbo powerplants driving counter-rotating ducted compressors;

FIGURE 25 is an enlarged fragmentary vertical sectional view taken as indicated by line 25—25 on FIGURE 24 illustrating the angularly movable island and the powerplant units contained therein;

FIGURE 26 is a transverse or vertical sectional view taken as indicated by line 26—26 on FIGURE 25;

FIGURE 27 is an enlarged vertical sectional view of the main propulsive nozzle with broken lines illustrating various positions of the vanes;

FIGURE 28 is a fragmentary vertical section of an airplane of the invention illustrating a periscope means; and FIGURE 29 is an enlarged sectional view of one of the outer lens assemblies of the periscope means.

The aircraft of the invention as illustrated in FIGURES 1 to 20 inclusive, includes an airframe, airfoil or body 10, which I will usually hereinafter refer to as the body, of circular plan-form. As best illustrated in FIGURE 2, the body 10 has a periphery 11 which is preferably concentric with an axis 12 which may constitute the center of gravity and the geometric center of the airplane. This periphery 11 is continuous and unbroken except for minor interruptions at the inlet and outlets of the propulsive system, to be subsequently described, and as seen in FIGURES 1, 3, 4 and 5, it is quite sharp to have good aerodynamic characteristics and to minimize the frontal area of the craft. In accordance with the invention the upper and lower surfaces or skins 13 and 14 of the airplane are convex and are preferably spherically convex, being in the nature of two like opposing spheroidal segments having their bases or chords coincident and joining at the plane of the peripheral edge 11. These spherical convex surfaces or skins 13 and 14 are smooth and regular to offer a minimum of drag and join at the circumferential edge 11 (leading and trailing edge) which itself is sharp and aerodynamically efficient. As briefly mentioned above, the body 10 has a diametric airfoil-rear region which is defined by a rather broad yet shallow rib portion 15 extending completely diametrically across the underside of the body 10 and a similar shallow rib portion 16 at the upper side of the body extending from adjacent the center thereof to its trailing edge. The lower side of the lower rib portion 15 is flat and substantially parallel with the plane occupied by the peripheral edge 11 and in a like manner the surface of the upper rib portion 16 is flat and parallel with the same plane. The primary purpose of the rib portions is to provide ample space within the aircraft for elements of the propulsive system, to be later described, although the rib portion constitutes a thin plate airfoil which assists in providing aerodynamic lift for the airplane. In practice the rib portions 15 and 16 need not be very thick and may die into the contours of the skins 14 and 13 adjacent the center of the craft. The sides or edges of the rib portions 15 and 16 which extend chord-wise of the body 10 are faired into the skins 14 and 13 respectively. However, where the portions 15 and 16 extend fore and aft along the fore and aft axis of the craft, they constitute a rib which serves as a vertical stabilizer for the airplane. The surfaces or skins 13 and 14, the skins of the rib portions 15 and 16, the peripheral edge 11, and other exposed parts of the airplane such as fairings, etc. are preferably constructed of stainless steel or other material capable of retaining adequate strength when subjected to the high temperatures developed during the multi-Mach number flight program.

The airframe 10, as just described, is inherently capable by reason of its geometrical configuration of withstanding heavy stresses and loads and the invention provides a simple yet strong internal structure for reinforcing the airframe and for assuming major structural and functional loads. A pressure bulkhead 17, curved in both plan-form and radial planes is provided in the body 10 and extends between and is secured to the upper and lower skins 13 and 14. The bulkhead 17 is concentric with the axis 12 and may be substantially vertical. A large diametered propulsive air duct 18 extends diametrically through the body 10 and intersects the circular bulkhead 17 to divide the space encircled thereby into two main passenger and/or cargo compartments 20. The duct 18, which will later be described in connection with the propulsive system, extends fore and aft and is coaxial with the rib portions 15 and 16 above described. As the duct 18 interrupts the bulkhead 17 and divides the bulkhead into two sections, there are walls 24 adjacent to and parallel with the duct for connecting the ends of their respective partially circular bulkhead portions. The main compartments 20 which may or may not be interconnecting depending upon the relative diameter of the air duct 18, are shown in the drawings as passenger compartments, being provided with rows of aft facing seats 31. The compartments 20 may, in practice, be defined by portions of the above mentioned walls 24 and by partitions 21, 22 and 23. The bulkheads or partitions 21, 22 and 23, together with the walls 24, define generally rectangular passenger compartments 20 and as the bulkhead 17 is circular, marginal compartments 25, 26 and 27 remain forward, aft and outboard of the main compartments.

The forward compartments 25 may constitute the pilot and crew areas, the outboard compartments 26 may be used to carry luggage, mail, cargo, etc, and the aft compartments 27 may be rest-rooms or toilets. The various compartments, just described, may be interconnecting. Entrances or hatchways 28 in the upper and lower skins 13 and 14 lead to the main compartments 20 and are equipped with sealed hatches or closures 30 capable of withstanding substantial pressure differentials. The various partitions and walls and particularly the bulkhead 17 and its wall portions 24 may be structural load assuming elements secured to one another and to the skins 13 and 14 to constitute a strong internal assembly or structure.

As briefly noted above, the regions or areas of the circular plan-form bi-convex body 10 around the passenger and load carrying compartments serve as fuel tanks or fuel cells which I have designated 32. The fuel tanks or cells 32 are bounded or defined by the skins 13 and 14, the bulkhead 17 and chord-wise walls or bulkheads 34 extending from the bulkhead 17 to the periphery 11 adjacent and generally parallel to the main air duct 18. I prefer to provide the fuel cells 32 with multiplicities of circumferentially spaced radially disposed internal baffles or bulkheads 35 and spaced circumferential or circular bulkheads 36. These bulkheads 35 and 36 which extend between the skins 13 and 14 and which are attached to the skins materially increase the strength and rigidity of the structure. The bulkheads 35 and 36 are perforated, having openings 29 and 39 respectively, so that the various regions or areas of the individual fuel cells 32 are in communication. It is to be noted that the fuel in the cells 32 is in heat absorbing or heat transfer relation to the major portions of the skins 13 and 14 and the bulkhead 17 and thus serves as a refrigerant to reduce the temperature of the skins and to protect the passenger and cargo compartments 20, 25, 26 and 27 against excessively high temperatures. The cooling or refrigerating action of the fuel and the refrigerating system will be more fully described hereinafter.

Special provision is made to supply or fill the fuel cells 32 with the low pressure fuel. Because butane, propane, and like fuels vaporize readily at normal ground temperatures, it is necessary to continuously withdraw vaporized fuel from the cells or tanks 32 as the cells are filled with liquid fuel and until the craft takes off. For this purpose the lower wall or skin 14 of each fuel cell 32 has two fuel conduits or fittings 37 and 38 (see FIGURES 17 and 18), the fitting 37 serving to discharge liquid fuel into the cell and the fitting 38 being adapted to bleed off fuel vapor from its respective cell. The fittings 38 have stand pipes 40 extending upwardly to adjacent the tops of the cells 32 to receive the fuel vapor. When refueling the airplane and until ascent has been initiated, pipes or hoses 41 are connected with the fittings 37 to supply liquid fuel to the cells and similar hoses 42 are connected with the fittings 38 to draw or carry away the fuel vapor. The fittings 37 and their related hoses 41 and the fittings 38 and their related hoses 42 may have identical detachable connections and valve means and while I will specifically describe the detachable connections and the valve means of the fittings 38 and their pipes or hoses 42, it is to be understood that this description is equally applicable to the corresponding connections and valve means of the fittings 37 and their pipes 41. As shown in FIGURE 18, the hoses or pipes 42 have spring clips 43, or the equivalent, detachably engaged with shoulders 44 on the fittings 38 to hold them in communicating connection with the fittings. Seal rings 47 are engaged between the fittings 38 and the hoses or pipes 42 to prevent the leakage of the vapor or fuel. The fittings 38 and the hoses or pipes 42 have opposing poppet valves 45 and 46, respectively, spring urged to closed positions. The relationship of the valves 45 and 46 is such that so long as the pipes 42 remain coupled with the fittings 38 the valves cooperate with one another to be held in the open positions where the fuel vapor is free to flow out through the hoses or pipes 42. The pipes 42 are connected with an absorption pump (not shown) for drawing away the fuel vapor and the hoses or pipes 42 are connected with a source or sources of the liquid fuel under pressure so as to deliver the liquid fuel to the cells 32 of the airplane. Preparatory to take-off and so long as the aircraft remains on the ground or field, liquid fuel is pumped in through the hoses or pipes 41 and the vaporized fuel is withdrawn through the hoses or pipes 42. When the aircraft rises vertically from the field or ground, the spring clips 43 snap out of engagement with their shoulders 44 allowing the fittings 37 and 38 to move upwardly out of engagement with their respective pipes 41 and 42. When this occurs the valves 45 and 46 automatically close to retain the liquid fuel and the vaporized fuel within the fuel cells 32 of the airplane and to avoid the spilling or leakage of the fuel from the hoses or pipes 41 and 42.

It is to be observed that the circular plan-form bi-convex aircraft body 10 provided with the partly circular fuel cells 32 has a large aggregate volumetric fuel storage capacity. This well adapts the craft for the utilization of butane or propane which have approximately 15% greater energy value than conventional aircraft fuels on a weight basis but are far less dense and, therefore, require large capacity storage space for comparable ranges of flight. By making the bulkhead 17 of less diameter the fuel capacity of the cells 32 may be greatly increased to extend the operational range of the craft. This is indicated and practical in the case of military craft where the personnel and the payload areas or compartments may be quite small. Furthermore, for military craft it may be desirable to use liquid hydrogen as the propulsive fuel to materially extend the operational range. Liquid hydrogen has a very low density (.086) with a boiling point density of 0.070 and on a volume per heat content basis requires approximately three times as much space as gasoline. However, for pilotless military aircraft and military aircraft carrying one or two men, the body 10 is such that it may be readily compartmented to contain ample liquid hydrogen as its fuel for a non-stop flight of, say, 7,500 miles. Such liquid hydrogen could well be supplied to or pumped into the fuel cells 32 in the same manner as the other fuels.

The lower boiling point fuels are especially well adapted for cooling the passenger and payload compartments and other critical regions of the aircraft and greatly reduce the temperature of the skin. Butane has a boiling point under 33° F. and propane has a boiling point of −45° F. Such fuels and the vapor therefrom in contact with the inner surfaces of the skins 13 and 14 prevent the skins from being excessively heated by the aerodynamically induced heat. Assuming the body 10 has a diameter of 50 ft. and that the craft is operated at a speed of Mach number 4 at an altitude of 100,000 ft. it is calculated that the temperature of the skin, unless provision is made for cooling it, would reach 1139° F. However, the skins 13 and 14 preferably have their outer surfaces chemically oxidized black or otherwise treated or coated to have a heat emissivity of approximately 0.95. This high emissivity will result in radiation of a substantial amount of heat energy into space. Although the emissivity of a surface is numerically equal to its absorptivity there is a distinct and novel advantage in providing the skins 13 and 14 of the airplane of this invention with external surfaces having high emissivity. The heat input to the skins 13 and 14 as a result of the frictional drag and the airplane speed is considerable. On the other hand solar radiation will tend to increase the skin temperature to only a very minor extent. It is estimated that the aerodynamically induced heat input to the skin will be approximately thirty times as much as the heat induced by solar radiation. Accordingly the skin surfaces of high emissivity and correspondingly high absorbtivity have the net effect of emitting many times as much heat energy as they are capable of absorbing and the surfaces of high emissivity function as effective heat dissipating elements of the cooling or refrigerating means of the invention. Additionally, the heat energy required to vaporize approximately 30% of the low boiling point fuel during the flight program is substantial, being in the neighborhood of 1 million B.t.u. per hour under the above assumed conditions. Thus it is calculated that the skin temperatures under the above conditions will come into equilibrium at about 940° F. The stainless steel skins 14 and 13 maintain their structural integrity at such a temperature and the internal structure adjacent thereto is not adversely affected at such a temperature. The material reduction in the temperature of the skins of the aircraft has the effect of increasing the efficiency and range of the craft. The reduction in skin temperature proportionately reduces the viscosity of the boundary layer air and therefore increases the aerodynamic efficiency of the circular plan-form bi-convex airfoil or craft.

The invention provides effective thermal insulation at the inner surfaces of the skins 13 and 14 at the bulkheads 17, walls 24, bulkheads 34, and other walls, bulkheads, etc. where necessary or desirable to thermally insulate the internal structure and the passenger and pay load areas of the aircraft, it being observed that the fuel cells 32 containing the low boiling point fuel and its vapor substantially surround the passenger and pay load compartments 20, 25, 26 and 27. The fuel cells 32 and their contents thus form effective thermal barriers protecting the passenger and pay load regions. FIGURES 14 and 15 illustrate one preferred form of insulation that may be used on the skins 13 and 14 and the several bulkheads, walls, etc. In describing this insulation, as illustrated, it will be assumed that it is provided on the inner surface of the skin 13, it being understood that such description is equally applicable to the other insulated areas and regions. The insulation includes "Alfol" blankets 48 which are comprised of pluralities of corrugated or crinkled aluminum or other metal foil sheets arranged and related so that there are multiplicities of air spaces between the adjacent foil sheets. Such insulation has a very low apparent density and a low $k$ factor and is therefore well adapted for this application. However, other appropriate thermal insulation or insulating materials may be used if desired. The blankets 48 of metal foil are engaged between spaced channels 50 fixed to the inner side of the skin 13 and arranged in parallel corresponding positions so that each blanket 48 has one edge received in a channel and has its opposite edge at the closed or back-side of the adjacent channel. In order to retain the rather loosely arranged blankets 48 I provide metal mesh, screens, or the like, 51, which extend between the inner flanges of the spaced channels 50 to extend across the blankets 48. Strips 52 overlie the screens 51 and are secured to the channels 50 by screws 49 to retain the insulating assembly in place. Immersion of this type of insulation, either temporarily or permanently, in the fuel and/or fuel vapor of the cells 32 does not impair the insulating qualities although it may alter the $k$ factor while the insulation is immersed, depending upon the proportion of fuel vapor between the layers. The foil of the insulating blankets 48 is preferably polished or bright to be most efficient in reflecting radiant energy under practically all conditions.

My copending application, Serial Number 669,369, filed July 1, 1957, is directed to the airfoil or body 10, its compartmentation, the fore and aft propulsive duct, the bulkhead means, etc.

In accordance with the broader aspects of my invention any suitable or selected type of alighting or landing gear may be employed. In the drawings, and more particularly in FIGURES 2 and 5, I have shown a plurality of spaced generally vertical shock absorbing struts 53 projectable from the underside of the body 10. The retractable struts 53 may be of the oleo type and are preferably arranged for vertical retraction into relatively small spaces or compartments 54 at the bulkhead 17 and adjacent the adjoining corners of the above described compartments 20, 26 and 27. In this connection it is to be observed that the landing gear struts 53 may readily be anchored or attached to the body 10 at regions where the landing loads may be transmitted directly to the strong rigid internal structure of the craft and that by reason of the circular configuration of the body 10 and the circular arrangement of its bulkhead 17 and other structural parts any selected or required number of the struts 53 may be installed in practically any required pattern or relationship. The lower ends of the landing struts 53 may be equipped with wheels, pads, or the like. In the drawings I have shown pads 55 on the struts 53 of such a nature that they may lie substantially flush with the surface of the lower skin 14, when the struts are retracted, so as to offer little or no aerodynamic drag.

It is contemplated that translational flight will usually be at such great altitude that visual observation by the passengers will be of minor consequences and there is no real necessity for the provision of windows, or the like, in the passenger compartment 20. It is also contemplated that the flight of the craft will be controlled by a remotely controlled automatic pilot means thus reducing the flight personnel to a minimum. However, to facilitate pilot controlled landings, maneuvers during emergencies, etc. either one or both of the pilot compartments 25 is provided with a periscope 56. Such a periscope is shown in FIGURES 28 and 29 where it will be seen to include a plano-convex lens 57 secured to each skin 13 and 14 adjacent to but inwardly of an appropriate opening 58 in its respective skin. Partially spherical outer lenses 60 are secured and sealed in these openings 58 and may have concentric inner and outer surfaces. The inner lenses 57 are spaced from the inner sides of the outer lenses 60 leaving fluid chambers or passages 61 and the inner lenses are sealed and secured at their margins in such a manner that cooling fluid or the propulsive fuel may be circulated to the passages by pipes 62 to be led away from the passages by pipes 63. These pipes 62 and 63 are connected with the fuel system, as will be later described, so that fuel under pressure is circulated through the passages 61 to cool the lenses 57 and 60. This cooling of the lenses by the low boiling point fuel maintains the transparency and optical properties as well as structural strength of the lenses during the high Mach number flight and as the fuel is colorless and transparent it does not materially interfere with the optical characteristics of the periscope. The periscope further includes a dual or common revolving eyepiece 64 at the pilot location receiving the light rays or images from the outer lens systems. The present invention is not primarily concerned with the specific details of the eyepiece 64 and any appropriate optical systems may be employed therein. The convex surfaces of the outer lenses 60 may protrude from the skins of the aircraft to increase the field of vision of the periscope but being smooth and spherical offer a minimum of aerodynamic drag. If desired, similar periscopes may be installed at the passenger compartments 20, etc.

The propulsive system of the aircraft illustrated in FIGURES 1 to 26 inclusive may be said to comprise, generally, a ducted compressor 65 capable of angular adjustment or movement to produce vertical lift and translational propulsion, upper and lower load turbo powerplants 66 and 67 for driving the compressor 65 and for producing propulsive thrust, outboard load turbo powerplants 68 and 69 for driving the compressor 65 and for producing propulsive and directional thrust, afterburner and ram jet combustor means 70 downstream from the ducted compressor 65, a variable ram or air inlet 71 for the ducted compressor 65 and ram jet means 70, a variable area and directional outlet or propulsive nozzle 72 for the ducted compressor and ram jet means, and various other parts and mechanisms associated with these primary propulsive elements.

The ducted compressor 65 is preferably located at or adjacent the geometric center of the circular planform airframe or body 10 and is pivotally mounted to be movable about a spanwise and preferably diametric axis so as to be turned to a vertical or generally vertical position during the vertical ascent and descent of the craft and to be brought to a position coaxial with the abovementioned fore and aft duct 18 for and during translational flight of the craft. The main air duct 18 extends diametrically through the circular body 10, as above described, and is provided at its forward end with the variable area inlet 71 and at its aft end with the variable area and directional nozzle 72. The major portion of the duct 18 is preferably cylindrical although its end portions are horizontally elongated, as will be more fully described in connection with the inlet 71 and the outlet or nozzle 72. The airframe or body 10 has a central vertical opening 73 which intersects the duct 18 and the propulsive compressor 65 is housed or carried in a structure 74 which I will term an "island." This island 74 is journaled at the vertical opening 73 to be movable or turnable therein about a horizontal spanwise axis. The island 74 may be a generally rectangular structure including an outer shell 75 which has flat vertical side walls that fit between the walls 24 of the compartments 20 with suitable clearance, and having upper and lower walls 76 and 77 which are generally flush with the upper and lower sides of the rib portions 15 and 16 of the body 10 when the island is in the horizontal position. This shell 75 is best shown in FIGURES 6, 7 and 8. The island 74 further includes a tube or duct 79 within the shell 75 having ends which join or merge with the ends of the shell 75. The forward portion of this duct 79 is cylindrical and of approximately the same diameter as the main air duct 18 to register therewith when the island is in the fore and aft position of FIGURES 6, 7 and 8. The major aft portion of the duct 79 is enlarged in diameter having a rearwardly flaring wall part 80 extending aft from the cylindrical forward duct portion and also having a rearwardly convergent wall part 81 at its aft end. This wall part 81 of the duct 79 acts as an effective propulsive nozzle when the island 74 is in a vertical position during vertical ascent and descent of the craft and discharges into the aft half of the main duct 18 when the island is in its fore and aft horizontal position.

The island 74 is supported for angular movement about the spanwise axis of tubular trunnions 82 projecting from the opposite sides of the island and journaled in roller bearings 83, or the equivalent, mounted in blocks 84 on the walls 24. The trunnions 82 are tubular for the reasons to be later described. In order that the island 74 may turn or pivot in the opening 73 with a minimum of air flow loss or leakage from the duct system, the opening and the island are of special configuration. As shown in FIGURES 2 and 8, the opposite ends of the island 74 as seen in top and bottom plan view are curved outwardly or are convex and the forward and aft end walls of the opening 73 are shaped to receive these parts of the island with appropriate working clearance. However, as best shown in FIGURE 7, the opposite side walls of the island 74 at its ends are curved inwardly or concave and the side walls of the duct at the intersecting opening 73 are shaped to conform with and receive these walls with clearance. With this formation and relationship of parts the island 74 is free to turn on its bearings 83 from the positions of FIGURES 6, 7 and 8 to the broken line vertical position of FIGURE 4 and yet conform with the opening 73 in the body 10. To reduce excessive air leakage from the opening 73 when the island 74 is in the position of FIGURES 6, 7 and 8, I provide lips or fairings 85 which overlap or overhang the margins of the island 74 at the ends of its opening or duct 79.

The ducted compressor 65 is of the supersonic class insofar as the relative velocity of entrained air against the blading is concerned and includes a rotor 86 fixed on a shaft 87 and carrying a row of supersonic blades 88.

The shaft 87 is coaxial with the island duct 79 and its axis intersects the axis of the trunnions 82. A web structure or spider 90 supports the shaft 87 and other elements in the island 74. The spider 90 has two vertical tubular struts 91 and a plurality of spaced radial struts 92, seen in FIGURE 6, extending outwardly to the wall of the duct 79 and has two lateral or spanwise struts 93 extending outwardly to and preferably integral with the trunnions 82. The several struts are spaced, proportioned and shaped to offer a minimum of resistance and drag to airflow through the duct 79 and the struts 91 and 93 are of special construction, as will be subsequently described. As best seen in FIGURES 7 and 8, the spider 90 has a central axial opening provided with a bearing 94 for the compressor shaft 87 and has a forwardly projecting hollow conical portion 95 whose forward end carries antifriction bearings 96 for the shaft. The compressor rotor 86 is secured on the shaft 87 ahead of this portion 95 and its blades 88 extend radially outward to have their tips adjacent the wall of the duct 79. With this construction it will be seen that the supersonic compressor 65 is adjacent and slightly forward of the axis of angular movement of the island 74 and the geometric center of the airframe or body 10. The periphery of the rotor 86 is rearwardly flaring and provided with a spheric or convex curvature and a tubular or annular fairing 97 is provided on the spider 90 to continue rearwardly therefrom and to present a surface which constitutes a continuation of the rotor configuration. The surfaces of the rotor 86 and fairing 97 may be generally concentric with the above described wall portion 80 of the duct 79. A spinner or streamlined hub 98 of generally conical shape is provided in front of the rotor 86, being carried by an extension 100 of the shaft 87.

In order to facilitate a better understanding of the invention the following data is given of a typical installation or embodiment wherein the airframe or body 10 is assumed to be 50 ft. in diameter and the craft is assumed to have a gross loaded weight of about 55,000 pounds. In such a case the diameter of the ducted compressor 65 will be 6 ft. and the speed of rotation of the compression rotor 86 will not exceed 3700 r.p.m., which is equivalent to the comparatively conservative top speed of 1200 feet per second, precluding the possibility of the rotor bursting. The compression ratio of the ducted compressor 65 will be 1.89 to 1 and the total weight flow of air through the ducts will be 770 pounds per second. It is to be understood that these figures are merely illustrative and, of course, will vary in different applications and aircraft.

The load turbo powerplants 66 and 67 serve to assist in driving or rotating the ducted compressor 65 and themselves produce propulsive gas stream or jets. The powerplants 66 and 67 are provided or arranged at a vertical axis which intersects the axis of rotation of the ducted compressor at or adjacent the geometric center 12 of the craft. In accordance with the invention the powerplants 66 and 67 are carried by the island 74 and are arranged on the upper and lower sides respectively of the island shell 75 assuming the island to be in the full line position illustrated throughout the drawings. As mentioned above the upper and lower sides of the island shell 75 have protruding fairings 78 for containing the powerplants 66 and 67. These fairings 78 are shallow and streamlined to offer a minimum of aerodynamic drag. The powerplants 66 and 67 drive shafts 102 which pass through tubular portions 103 of the spider struts 91 to points adjacent the compressor shaft 87 and are operatively connected with the compressor shaft by a transmission, to be later described. In accordance with the invention the powerplants 66 and 67 are supercharged by the ducted compressor 65, that is compressed air from the compressor is bled or delivered to the inlets of the powerplants. For this purpose the struts 91 of the spider 90 have air passages 108 of substantial capacity leading from their forward edges rearwardly and then vertically to the powerplants 66 and 67.

The two load turbo powerplants 66 and 67 may be substantially identical and each is arranged within a housing 104 in its respective fairing 78. These housings 104 have bosses 105 at their inner sides secured in sockets 106 in the outer ends of the struts 91. Each turbo powerplant 66 and 67 has a casing 107 engaged in its housing 104 and provided at its inner side with a boss 109 removably engaged in the boss 105 of the housing. This arrangement facilitates ready removal of the powerplants from the housings 104 for servicing, replacement, etc. Each powerplant 66 and 67 includes a unirotor 110 freely rotatable on its respective shaft 102 and provided with compressor blading 111 at the entrance of the casing 107. Annular conic passages 112 lead from the compressor blading 111 to annular combustion chambers 113. The casings 107 have partitions and walls defining the compressor passages 112 and the annular combustion chambers 113, and fuel injection rings 114 are provided in the combustion chambers. The chambers 113 are shaped to substantially reverse the flow of the compressed air and products of combustion and discharge through nozzles against curved or Francis type turbine blades 115 on the unirotors 110. Electrical ignitors 119 are provided for the chambers 113. The blades 115 acted upon by these gases drive the unirotors 110 at high velocity, say at 46,000 r.p.m. Load turbine wheels or rotors 116 are splined or keyed on the shafts 102 at the outer ends of the unirotors 110 and carry rows of turbine blades 117. Rows of stator blades 118 on the casings 107 extend into the expansion zones of the turbine system between the blades 115 and 117. The high pressure, high velocity gases and air impinging or acting on the turbine buckets 117 drive the load turbines 116 and shafts 102 at a speed of, say, 16,000 r.p.m., the data of this paragraph being based on a structure where the unirotors 110 have a diameter of 11 inches and the load rotors 116 have a diameter of 19.2 inches. The streams or jets of the high pressure, high velocity gases discharging from the powerplants 66 and 67 are utilized to assist in propelling the aircraft and to add stability to its flight. Fittings 120 are provided at the outer sides of the housings 104 and have series of streamlined vanes 121 for directing the gas flow. These turning vanes 121 are directed outwardly or vertically and rearwardly so that the issuing jets or streams are directed rearwardly to produce forward propulsive thrusts. Fuel pipes 122 carry fuel to the injection rings 114 and electrical conductors 123 lead to the ignitors 119 of the powerplants 66 and 67. It will be seen that upon disconnection of the pipes 122 and wires 123 the fittings 120 may be removed to allow easy withdrawal of the entire powerplants from their housings 104. This facilitates maintenance and replacement of the powerplants. The pipes 122 receive fuel from a flexible pipe unit 179 comprised of pipe sections connected by rotary joints, see FIGURES 6 and 20. The pipe unit 179 in turn receives the fuel from a main fuel line 185, to be later described in more detail. The flexible unit 179 is such that it does not interfere with free pivoting of the island 74.

The tip or outboard powerplants 68 and 69 are provided to assist in driving the ducted compressor 65, to produce propulsive jets, and they are controllable to provide for or to assist in the steering or directional control of the craft. The turbo jet load powerplants 68 and 69 are positioned on the periphery of the circular plan-form airframe or body 10 on a common diametric axis which intersects the axis of rotation of the ducted compressor 65 and the longitudinal axis of the ducts 18 and 79 at or adjacent the geometric center 12 of the body 10. In the aircraft illustrated where the periphery of the body 10 is sharp or thin, I provide streamlined enlargements or pods 124 at the outboard edges or "tips" of the body to contain the powerplants 68 and 69 and their auxiliaries and controls. These pods 124 may be designed or shaped to reduce the vortices losses at the margins or tips of the craft. As best shown in FIGURE 16, each pod 124 may be considered to have an inner permanent section and an outer detachable or jettisonable section. The inner sections are defined by inner walls 125 which may extend between two adjacent radial bulkheads 35 and intermediate walls 126 which may occupy chordal planes relative to the periphery 11 of the body 10. The inner walls 125 may constitute bulkheads or walls of the fuel cells 32. The outer sections of the pods 124 are defined by the intermediate walls 126 and by outer walls 127. The outer walls 127 are secured to the aircraft structure by breakable or frangible connections or joints 129 so that they may be detached or broken from the craft in the event their respective powerplants burst. The powerplants 68 and 69 are housed in the outer sections of the pods 124, that is between the walls 126 and 127, while their auxiliaries are housed between the walls 125 and 126.

Like the inboard load powerplants 66 and 67, the outboard or tip turbo powerplants 68 and 69 are supercharged by the ducted compressor 65, receiving compressed air from the compressor duct 79 and further compressing it before it reaches their respective combustion zones. The above described struts 93 of the island spider 90 and the trunnions 82 are tubular to have air passages 128 opening forwardly at the forward ends of the struts to receive the compressed air from the duct 79 and curving rearwardly and laterally to pass through the trunnions. The outer ends of these passages 128 communicate with tunnels or tubes 130 of substantial capacity which extend radially outward through the compartments 20 and 21 and the fuel cells 32 to conduct the compressed air to the outboard powerplants 68 and 69. The tubes 130 have their outer ends at the inner walls 125 of the pods 124 where they communicate with turnable or rotatable tubular trunnions 131. The trunnions 131 are rotatably supported by bearing means 132 at the walls 126 and their outer ends join and communicate with the inlets of the casings 207 of the powerplants 68 and 69. The trunnions 131 and casings 207 are connected so that the trunnions support the powerplants 68 and 69 for angular movement about a spanwise or diametric axis which intersects the fore and aft axis of the body 10 at the geometric center 12 of the body. However, the connections between the trunnions 131 and casings 207 are frangible to fail in the event of explosion of their respective powerplants or the bursting of a related powerplant rotor so that the individual powerplants and their respective pod walls 127 are free to detach or jettison from the craft in the event of such failure. In the particular arrangement illustrated the trunnions 131 and powerplant casings 207 are joined at internal and external annular weakening grooves 133, these joints or connections being such as to withstand all normal operating loads but to fail in the event of explosion or bursting of the related powerplants.

The tip or outboard turbo load powerplants 68 and 69 are operable to drive radial shafts 134 which, in turn, are drivingly connected with the ducted compressor shaft 87. The shafts 134 extend outwardly through the struts 93 and axially through the tubes 130, being supported in bearing sleeves 135 mounted coaxially in the tubes by spaced webs 136. The inner ends of the shafts 134 are drivingly connected with the compressor shaft 87 by the transmission means, to be subsequently described, while the outer portions of the shafts extend through or into the casings 207 of the outboard powerplants. The load turbo powerplants 68 and 69 may be of the same construction and have the same mode of operation as the inboard powerplants 66 and 67, each comprising a unirotor 210 rotatable on its shaft 134 and carrying compressor and turbine blading 211 and 215, an annular air passage 212 and combustion chamber 213, a fuel injection ring 214 in the combustion chamber, a load driving wheel or rotor 216 having turbine buckets 217 and the stator vanes 218 between the rows of turbine buckets 215 and 217. Reference may be had to the description of the powerplants 66 and 67 for the construction and operation of the corresponding elements of the powerplants 68 and 69. The fuel injection rings 214 are supplied with fuel by pipes 222 and electrical leads 223 extend to the ignitors 219 of the combustion chambers 213. The pipes 222 and wires 223 or suitable portions thereof, are flexible to permit rotation of the respective powerplants 68 and 69 and have disconnect fittings at the bulkhead 126. The pipes 222 receive fuel from the supply pipe 185 where the latter connects with the flexible pipe unit 179, see FIGURES 6 and 20. The outboard load powerplants 68 and 69 have discharge or nozzle fittings 220 corresponding generally with the fittings 120 and provided with direction changing vanes 221 for directing the propulsive jets substantially normal to the axes of rotation of the rotors 210 and 216. The fittings 220 are secured to the casings 207 to move therewith and the outer walls 127 of the pods 124 have openings 137 in which the fittings and vanes 221 are free to turn. The means for turning the outboard powerplants 68 and 69 to alter or control the direction of the propulsive jets discharging from the nozzle fittings 220 include curved or segmental racks 138 fixed on the trunnions 131 and pinions 139 meshing with these racks. Reversible electric motors 140 drive the pinions 139. The controls for the motors 140 will be later described. The motors 140 are housed in the inner portions or sections of the pods 124. As will be later described the power output or thrust from the outboard powerplants 68 and 69 may be correspondingly and differentially regulated and the powerplants may be turned to various angular positions to alter the direction of their propulsive jets to effect directional control of the aircraft.

It is to be observed that the load turbo powerplants 66 and 67 and 68 and 69 are arranged and located in such a fashion that explosion or bursting of any of them during flight will not endanger the occupants or any critical portions of the craft. The rotors and wheels 110 and 116 of the powerplants 66 and 67 rotate in planes parallel with and spaced above and below the airframe proper and remote from the passenger compartments and fuel cells 32 and bursting of these elements will not endanger either the occupants or any critical regions of the craft. The rotors and wheels 210 and 216 of the outboard load powerplants 68 and 69 rotate in planes far remote from and parallel with the side walls 24 of the occupied compartments and outboard from the fuel cells 32 and the periphery of the airframe. Bursting of these elements 210 and 216 cannot endanger either the occupants or the structure. The shafts 134 of the outboard load powerplants 68 and 69 have weakening grooves 141 adjacent the planes of the walls 126, the planes of the weakening grooves 133 of the trunnions 131 and adjacent the inner ends of the rotors 210. Bearings 149 support the shafts 134 adjacent these grooves 141. By reason of the breakable attachments of the pod walls 127, the break grooves 133 in the trunnions 131, and the break grooves 141 of the shafts 134 an entire powerplant 68 or 69 and the associated wall 127 will break free and detach from the craft in the event one of its wheels or rotors explodes. Likewise the inboard load turbines 66 and 67 are furnished with frangible regions 145 in the shafts 102 whereby the explosion of a rotor would permit the particular load turbine concerned to separate from the main structure and to be jettisoned by breaking open the relatively light fairing 78.

The invention provides means for maintaining a directionally controllable propulsion jet or stabilizing and direction maintaining jet from the remaining trunnion 131 of the failed powerplant 68 or 69. This means includes a lateral opening 142 in the wall of each trunnion 131 and passages or ducts 143 leading from the openings to discharge compressed air outwardly and rearwardly from the faces of the walls 126. The openings 142 are normally closed by doors 144, hinged in the trunnions 131, so that prior to failure of a powerplant compressed air from the tubes 130 is obliged to flow to and through the powerplants. The pressure within the trunnions 131 holds the doors 144 closed during normal operations. However, in the event of failure and detachment of a powerplant 68 or 69, the pressure within the related trunnion 131 drops and the airflow acting on a lip 146 at the inner edge of the respective door 144, swings the door to the broken line position of FIGURE 16 where it closes off the outer end of the trunnion and opens the opening 142. The doors 144 have slots 147 for receiving the adjacent shafts 134 when the doors swing to the positions where they close off the outer ends of the trunnions, these slots normally being closed by posts 148 in the ducts 143. When a door 144 is swung to the position where it closes off the outer end of its trunnion 131, the airflow is diverted through the related duct 143 and discharges therefrom in the form of a propulsive and directional jet. The duct 143 may be broad or arcuate and of sufficient width to permit the jet discharged through the opening 142 to be employed as a directional control jet as well as a propulsive jet.

The invention provides a simple, compact and refrigerated or cooled transmission for transmitting power from the shafts 102 and 134 of the inboard load turbine powerplants 66 and 67 and the outboard load powerplants 68 and 69 to the shaft 87 of the ducted compressor 65. This transmission includes a spiral bevel gear 150 fixed on the aft end of the compressor shaft 87 to operate within the spider 90. Four stub shafts 151, spaced about 90° apart and arranged to be coaxial with the central vertical axis of the island 74 and the spanwise axis of the body 10, are rotatably supported in the spider 90 and have spiral bevel pinions 152 fixed thereon to mesh with the gear 150. The pinions 152 meshing or cooperating with the gear 150 at four regions spaced 90° apart assure balanced or symmetrical loading of the gear and its shaft. There is a stub shaft 151 axially aligned with the inner end of each shaft 102 and 134. I prefer to provide overrunning clutches 153 between the shafts 102 and 134 and their respective or related stub shafts 151 whereby the turbine powerplants 66 to 69 inclusive are each operable to drive or transmit power to the ducted compressor 65 and yet the compressor may overrun or rotate faster than any one or all of the load powerplants without transmitting power thereto. These overrunning clutches 153 may be of any preferred or appropriate type. In the case illustrated they each include a toothed sleeve 154 meshing with the toothed end of a stub shaft 151 and cooperating with spiral splines on the respective shaft 102 or 134 to back away from the adjacent stub shaft when the compressor 65 overruns the related powerplant 66, 67, 68 or 69. The hollow conic portion 95 of the spider 90 serves as a lubricant sump or reservoir for the shafts, bearings and other working parts in or associated with the spider.

The means or system for cooling or refrigerating the transmission and working parts in and adjacent the spider 90 utilizes the low boiling point fuel as the coolant or refrigerant. As best shown in FIGURES 6 and 20, a fuel pipe 155 connects with the flexible fuel pipe unit 179 and extends inwardly through one of the spider struts 92 and the spider fairing 97 to have its inner end communicate with an annular manifold or jacket chamber 156 in the wall of the conic spider portion 95. This chamber 156 encircles the fuel reservoir of the fairing 97 and the bearings 96 of the compressor shaft 87 and has its rear end adjacent the overrunning clutches 153. Annular or circular cooling passages 157 are formed in the spider 90 to communicate with the aft end of the chamber 156 and to surround the several overrunning clutches 153. A coolant chamber 158 is provided in the aft portion of the spider 90 and the four passages 157 communicate with the peripheral region thereof.

The chamber 158 generally parallels the plane of the gear 150 and the refrigerant therein cools the gear and pinions 152 and protects the various elements of the transmission against the heat of the fuel consumed in the duct 79 and the duct 18. The chamber 158 serves to conduct the fuel-refrigerant radially inward to the fuel injector 166, to be later described, so that there is a fuel flow through the chamber, the passages 157 and the jacket or chamber 156. It will be seen that the fuel-refrigerant flowing through the jacketed and ported spider 90 effectively cools the various rotating or moving parts of the transmission system, the bearings 94 and 96 of the compressor shaft 87 and the lubricant in the spider. The heat energy absorbed by the fuel in flowing through the jackets and passages of the spider 90 is recovered or utilized upon burning the fuel and augments the propulsive effect of the propulsion system.

As mentioned above, the island 74 carrying the ducted compressor 65 is pivotally movable about the spanwise axis of the airframe or body 10 between the position where its air duct 79 is aligned with and in register with the main air duct 18 of the body 10 and the position where the island duct 79 is vertical or substantially normal to the duct 18. The means for rotating or moving the island 74 includes a rack 160 secured to the island and a pinion 161 meshing with the rack and driven by a reversible electric motor 162. The motor 162 is mounted on or at one of the body walls 24 as shown in FIGURE 6 and its shaft 165 extends through a slot 163 in the shell 75 of the island 74 so that the pinion 161 may mesh with the rack 160. As seen in FIGURE 7 the rack 160 and the slot 163 are curved or arcuate, being concentric with the pivotal axis of the island 74. Appropriate brackets 164 mount the elongate curved rack 160 in the island 74. It will be seen that upon operation of the motor 162 in one direction the island 74 is turned or swung from the position of FIGURES 6, 7 and 8 where it is aligned with the duct 18 to the broken line position of FIGURE 4 where it is vertical or normal to the duct 18 to provide for vertical operation of the craft and upon operation of the motor 162 in the other direction the island is returned to the position where its duct 79 is aligned with the main air duct 18. The island 74 of course may be moved to intermediate positions where it is disposed at angles of less than 90° to the duct 18. The control system for the motor 162 will be later described.

The combustor means or fuel injection means 70 provides for the injection of fuel into the island duct 79 adjacent but downstream from the ducted compressor 65 and for the introduction of regenerative fuel vapor into the duct 18 at a region further downstream from the compressor. The first mentioned area or phase of fuel injection may be considered afterburning and the means 70 includes what may be termed an afterburner fuel spinner 166 associated with the ducted compressor 165. The aft end of the compressor shaft 87 has an extension 167 and the spinner 166 is keyed or fixed thereon to rotate with the shaft. The spinner 166 is a conical member having its apex facing aft and the spinner has a central fuel cavity 168. A boss 170 on the forward end of the spinner 166 rotatably engages in the aft end of the spider 90 and has a plurality of radial ports 171 communicating with the above described refrigerant-fuel chamber 158 of the spider. The ports 171 lead to the cavity 168 so that the fuel after passing through the several cooling chambers and passages of the spider 90 flows into the interior of the spinner 166. The spinner 166 which rotates with the compressor shaft 87 has several rows of radial ports 172 extending outwardly from the cavity 168 to the periphery of the spinner. These ports 172 discharge the fuel radially outward into the air duct 79, centrifugal force acting to throw the liquid fuel outwardly across the passage 79, as indicated by the arrows in FIGURE 7, to be effectively distributed and mixed with the compressed air flowing through the passage to assure substantially complete well distributed combustion of the fuel. The means for igniting the fuel discharging from the spinner 166 includes an annular wall or baffle 173 on the aft end of the spider 90 surrounding the forward end of the spinner 166 with considerable clearance. A few spaced ports 174 extend radially through the wall of the spinner 166 from its cavity 168 to its periphery to discharge the fuel outwardly against the baffle 173, the baffle providing a relatively stagnant region of near-stoichiometric fuel-air ratio, favorable to ignition of the fuel under all conditions. The baffle directs or diverts this fuel rearwardly to intersect the planes of fuel flow from the main fuel ports 172. An electrical ignitor 175 extends into or through the baffle 173 to ignite the fuel diverted rearwardly by the baffle. It will be seen that the fuel diverted aft by the baffle 173 and ignited in this manner progressively ignites the fuel discharging from the axially spaced rows of main fuel ports 172. Thus the baffle 173, the ports 172 and the ignitor 175 constitute an effective fuel ignition system for the afterburner.

The fuel injecting means 70 further includes what may be termed a regenerator for introducing fuel vapor into the ram jet duct 18 at a point or region downstream from the island 74. This regenerator serves to protect the walls of the duct 18 against the high temperatures that are produced therein during flight. A regenerator shell 176 surrounds the duct 18, extending rearwardly from adjacent the island 74 to the aft region of the duct. The shell 176 is spaced around the duct 18 to leave or provide an annular vaporizing and insulating fuel space 178, the shell and duct being connected for mutual reinforcement and support by longitudinally spaced circular perforated channels or bulkheads 177. Fuel vapor is led from the upper portions of the fuel cells 32 to the aft end of the regenerator space 178 by pipes 373. The pipes 373 may extend along the walls of the passenger compartments 20 so that the fuel vapor assists in refrigerating the compartments, see FIGURE 2. Liquid fuel is also led into the aft portion of the regenerator space 178 by a pipe 182. The pipe 182 also has a control valve 183, see FIGURES 2 and 10, controlled in the manner to be subsequently described. The fuel vapor and/or liquid fuel flows forwardly through the regenerator space 178 and discharges radially inward at substantial velocity from one or more rows of jets or ports 184 in the wall of the duct 18 adjacent the forward end of the regenerator. The arrows in FIGURE 8 illustrate the manner in which the fuel vapor is injected radially into the air and gas stream flowing through the duct 18 to be distributed therein for combustion to add materially to the thrust output of the propulsive system. The fuel vapor and the liquid fuel vaporized in the regenerator space 178 absorbs heat from the walls of the duct 18, thereby reducing the temperature of the duct and protecting the duct against damage by the high temperature in the afterburner or combustion zones of the duct. The heat thus absorbed by the fuel is returned to the propulsive cycle or system when the vapor is introduced into the duct 18 for combustion therein.

The fuel supply system for the load turbo powerplants 66, 67, 68 and 69 and for the afterburner and regenerator combustor means 70 includes a main liquid fuel line 185 leading from the lower portions of the fuel cells 32 and equipped with a suitable pump 186 for pumping the fuel to the propulsive units, see FIGURE 20. The main liquid fuel pipe 185 leads to the above described flexible unit 179 and pipe 155 which in turn discharges into the spider jacket space 156, the ports 157 and chamber 158 leading from this space to the fuel injecting spinner 166 as above described. The fuel supply pipes 122 for the inboard load turbo powerplants 66 and 67 extend through struts 92 of the spider 90 and through the fairing 97 to connect with and receive fuel from the flexible pipe unit 179, see FIGURE 6. The fuel supply pipes 222 of the outboard load powerplants 68 and 69 extend inwardly through the fuel cells 32 to connect with the pipe 185 so that fuel is supplied directly to the powerplants 68 and 69. A conductor or pipe 182 for supplying liquid fuel to the regenerator space 178 leads to and connects with one of the pipes 222 to receive fuel under pressure therefrom.

In accordance with the invention the liquid fuel, being pumped or delivered to the several propulsive units of the propulsion system is utilized as a coolant or refrigerant to cool the air being supplied to the passenger compartments and other occupied compartments of the craft. The passenger compartment or cabin air supply system includes a heat exchanger 187 for each compartment 20 and its associated compartments 25, 26 and 27. The heat exchangers 187 are suitably positioned adjacent the duct 18 and pipes 188 tap into or communicate with the above described air ducts or tubes 130 and extend to the heat exchangers to circulate compressed air therethrough. Ducts 190 carry this air under pressure, after being cooled in the heat exchangers 187, to the compartments 20 for discharge therein. Bypasses 191 in the main fuel pipe 185 circulate the liquid fuel through the heat exchangers 187, the heat exchangers being designed to effect a transfer of heat from the compressed air flowing therethrough to the liquid fuel thus circulated therethrough. It is to be observed that the aerodynamically induced heat and the heat of compression of the air thus supplied to the cabins is extracted by the fuel which is subsequently burned in the several propulsive units and this heat is accordingly recovered or utilized to assist in propelling the aircraft. The bypasses 191 have valves 192 for regulating the coolant-flow therethrough to thus regulate the air cooling action of the heat exchangers 191. These valves 192 are, in turn, operated or regulated by thermostats 193 arranged to be responsive to the temperatures of the air in the cabins or compartments 20. The compartments 20 have outflow valves 194 designed to maintain a suitable air pressure level in the cabin areas, such valves being conventional and well known in the aircraft industry.

As illustrated in FIGURE 20, liquid fuel bypass lines 195 connect with the main liquid fuel pipe 185 and extend to the outer lens systems 57—60 of the periscopes 56. The liquid fuel flowing through these bypasses 195 circulates through the above described chambers or passages 61 of the periscopes to cool the lenses 57 and 60 and maintain their structural and optical characteristics.

The inlet 71 of the main propulsive air duct 18 is in the nature of a supersonic variable area ram inlet and is illustrated in detail in FIGURES 12 and 13. As already briefly described the forward or inlet end portion of the duct 18 is elongated in the spanwise direction. Thus, as seen in FIGURES 2, 3 and 13, the forward portion of the duct 18 flares forwardly and spanwise while at the same time is reduced in its vertical dimension to terminate at a rectangular forward opening 197. This opening 197 is in the lower rib 15, being below the periphery 11 of the body 10, and has generally straight horizontal and vertical margins at its forward terminus. It should be noted that the elongate entrance of the opening 197 conforms generally with the thin forward edge or periphery of the body 10 to keep the frontal area of the craft at a minimum. As best illustrated in FIGURE 12 the ram inlet 71 has a Venturi like throat provided by upper and lower forward wall portions 198 which curve rearwardly and inwardly toward the longitudinal axis of the inlet opening and rearward upper and lower wall portions 199 which curve forwardly and inwardly to join with the wall portions 198 at a throat 200. The forward wall portions 198 are slightly concave while the rearwardly flaring rear wall portions 199 are curved and shaped to merge with the cylindrical walls of the duct 18. The throat 200 presents opposing upper and lower convex surfaces. As seen in FIGURE 13 the end walls 201 of the inlet are flat and vertical, these flat walls extending rearwardly from the forward terminus of the inlet opening 197 to a region some distance rearwardly of the throat 200.

The variable ram inlet 71 includes an island 202 of variable volume or variable vertical cross section arranged in the ram inlet opening 197. This island 202 includes a fixed rigid nose 203 extending horizontally or spanwise through the forward end of the opening 197. The ends of the nose 203 are anchored at the sidewalls 201 and the nose is thin in vertical cross section to present a forward knife edge and has upper and lower sides diverging slightly from this edge. The island 202 further includes flexible metal walls 204 extending rearwardly from the nose 203 and rigid-material rear walls 205. Hinge connections 206 join the rear edges of the flexible walls 204 with the forward edges of the rigid-material walls 205. A hinge connection 235 hingedly connects the rear edges of the two rear walls 205 and the pin or pins 236 of this connection are slidable in longitudinal slots 237 in the sidewalls 201 of the opening 197. Seal strips 238 of asbestos cloth, or the like, are secured to the ends of the walls 204 and 205 to engage and seal with the side walls 201 of the opening 197, to reduce or prevent the leakage of fluid pressure from the interior of the island 202. These seal strips 238 are shown in FIGURE 13 where it will be seen they are arranged and designed to effectively prevent the outward leakage of fluid from the island.

The island 202 constructed and arranged as just described, is adapted to be inflated to a condition such as shown in full lines in FIGURE 12 to constrict or reduce the effective capacity of the throat 200 for supersonic flow and supersonic diffusion and also for deflation to a condition such as shown in broken lines in FIGURE 12 to permit large mass flow through the throat 200 during subsonic flow. The inflatable island 202 is responsive to aerodynamic conditions in the ram inlet 71, being automatically inflated or enlarged supersonic flow to more or less restrict the throat 200 and being deflated during subsonic flow to increase the effective or operational size or cross section of the throat. In accordance with the invention means for admitting the expanding or inflating air under pressure to the interior of the island 202 is controlled by an air pressure relay means which, in turn, is responsive to the aerodynamic conditions in the ram inlet. The means for admitting air under pressure to the interior of the island 202 includes a port or passage 239 having an open end communicating with the inlet passage 197 aft of the most restricted region of the throat 200. As shown in FIGURE 12, passage 239 has its open end at one of the walls 199 to receive high pressure air from the diffuser region of the ram inlet passage where a large portion of the kinetic energy of the air is converted into pressure. A valve seat 240 is provided on the wall of the passage 239 and a pipe 241 leads from adjacent the valve seat to one side wall 201 of the ram inlet opening 197 where it communicates with the interior of the island 202, see FIGURE 13. A movable valve closure 242 is adapted to cooperate with the seat 240 to control the pressure flow through the passage 239. The wall structure of the inlet ram 271 has a chamber 243 separated from the passage 239 by a wall or partition 244 and a stem 245 on the valve closure 242 slidably passes through an opening in this partition to extend into the chamber 243. A diaphragm, Sylphon bellows 246, or the equivalent, has one end anchored in the chamber 243 and has its other end operatively connected with the valve stem 245. The free or unanchored end of the bellows 246 is exposed to and acted upon by air pressure in the chamber 243 which tends to compress or contract the bellows and thus open the valve closure 242. The pressure for effecting this actuation of the diaphragm or bellows 246 is admitted to the chamber 243 by a port or pressure tap 247 communicating with the ram inlet opening 197 some distance forwardly of the region of greatest restriction of its throat 200. Internal pressure in the bellows 246 tends to expand the bellows and move its free end in a direction to close the valve closure 242 against its seat 240. A port or pressure tap 248 supplies this internal pressure to the bellows 246. This pressure tap 248 communicates with the inlet opening or passage 197 in a region downstream from the tap 247 and adjacent the area of greatest restriction of the throat 200 where the final shock waves strike or impinge against the walls of the throat. The broken lines 250 and 251 in FIGURE 12 represent shock waves originating at the knife edge of the island nose 203 and the marginal lips 249 respectively of the ram opening 197, under supersonic operating conditions. These expansion waves or shock waves 250 and 251 originating at the nose 203 and lips 249 are successively reflected by the walls 198 and 204 so as to repeatedly intersect before reaching the throat 200. In this connection it is to be observed that the walls 198 and 204 are preferably concave so that upon each reflection of a given shock wave from a wall the wave leaves said wall at a lesser angle than its angle of incidence. This tends to bring the final shock waves to the region adjacent the tap 248. Further and more important, there is a distinct change in angle of the shock waves 250 and 251 after they intersect. Thus, as seen at the point or line A of intersection of the waves 250 and 251, the angle of the waves has been appreciably changed and been made more oblique to the longitudinal axis of the inlet. Again at the line B of intersection the waves 250 and 251 travel at more oblique angles to the longitudinal axis of the passage and this is also true at the third line of intersection C. The net result of these several changes of the angles of reflecting and intersecting waves 250 and 251 traveling aft in the inlet passage is the final impingement of the wave 250 against the wall 198 at or adjacent the pressure tap 248. As the wave 250 is a region of increased pressure the impingement of the wave against the wall 198 at the leading edge of the pressure receiving tap 248 produces increased pressure in the bellows 246. Such increased pressure in the bellows 246 tends to move the valve closure 242 toward its seat 40 to reduce the pressure in the island 202 allowing the island to contract by reason of the external forces and pressures acting thereon and thereby increase the area or effective flow path through the throat 200. This is the action of the automatic ram inlet 71 when the island 202 is obstructing the throat 200 to a greater extent than the flow conditions warrant. Conversely when the inflatable island 202 is not, under the prevailing conditions, sufficiently obstructing the flow through the throat 200, the final shock wave 250 will tend to move downstream away from the pressure tap 248 so that the pressure in the bellows 246 is reduced relative to the pressure in the chamber 243 and the valve closure 242 is moved away from its seat 240 to admit additional air pressure into the island 202 to expand the island and thereby further restrict the throat 200. Thus under supersonic flow conditions the island 202 is automatically partially inflated and deflated in response to the aerodynamic conditions in the ram inlet itself to regulate the air flow into the main propulsive air duct 18 and the final oblique shock wave will tend to assume a position of equilibrium with its terminus near the central portion of the tap 248. During subsonic operating conditions the forces and pressures acting on the walls 204 and 205 of the island 202 deflate or collapse the island to a condition such as illustrated in broken lines in FIGURE 12 where it offers a minimum of obstruction to airflow into the duct 18. It is to be observed that upon inflation and deflation of the island 202 its walls 204 are flexed from the substantially straight or flat condition of the broken lines in FIGURE 12 to the curved or concave conditions of the full lines, the flexible walls and their nose 203 presenting aerodynamically efficient surfaces under all conditions. The pins 236 are free to slide in the slots 237 during inflation and deflation of the island and it will be noted that the slightly convex walls 205 present smooth aerodynamically efficient surfaces under all conditions. The variable area inlet ram means 71 is self sufficient and requires no external control means or motive power.

My copending application, Serial Number 669,879, filed July 3, 1957, now Patent No. 2,973,621, describes and claims the above described variable area ram inlet.

The main propulsive jet outlet or nozzle 72 at the aft end of the duct 18 automatically changes from a subsonic nozzle to a supersonic nozzle and vice versa in accordance with the flow conditions of the discharging air and gas jet, incorporates variable direction features to produce pitching trim during certain phases of the flight program and is operable as an air brake to reduce the velocity of flight under certain conditions. As already mentioned the nozzle 72 is elongated horizontally or spanwise of the body 10 and, as illustrated in FIGURE 1, the medical spanwise plane of the nozzle is substantially coincident with the plane of the periphery 11. Furthermore, the nozzle 72 is substantially rectangular having a passage or opening 252 that has a rear terminus defined by vertical side walls 253 and horizontal upper and lower margins. The nozzle passage or opening 252 merges into the aft end of the cylindrical main propulsive duct 18 having its walls converging or curving forwardly and inwardly to smoothly join the walls of the duct. The above-mentioned walls 24 extend aft to the periphery 11 of the body 10 in spaced generally parallel relation to the duct 18 and nozzle sidewalls 253 to leave spaces 254 useful in containing certain actuating elements of the nozzle 72. As best illustrated in FIGURES 9, 10 and 11, the nozzle 72 includes three movable or pivotal vanes, a center 255 and upper and lower vanes 256. The vanes 255 and 256 extend horizontally or spanwise, being in planes parallel with the periphery 11 of the body 10 and are in parallel relation to one another in the horizontally elongated nozzle opening 252. The three vanes are turnable or rotatable on their longitudinal axes, the center vane 255 having tubular end trunnions 257 journaled in openings in the end walls 253 of the nozzle opening. The upper and lower vanes 256 have end shafts 258 also journaled in the end walls 253. In accordance with the invention the three vanes 255 and 256 are spaced apart vertically, having partially cylindrical bodies concentric with their respective axes of rotation and spaced one from the other to leave the two parallel exit or discharge passages 260. The noozle vanes 255 and 256 are streamlined and of "tear-drop" shape, the central vane 255 having a tapering tail or lip 261 and the upper and lower vanes having similar rearwardly extending lips 262. The rear surfaces of the lip 261 are slightly concave and extend rearwardly from the cylindrical periphery of the vane 255 in converging relation to provide the lip 261 with a rather sharp rear edge. The rear surfaces of the lips 262 on the vanes 256 which face or oppose the vane 255, are concentric with the cylindrical surface of the vane 255 when the nozzle 72 is adjusted to minimum opening while the outer sides of the lips 262 may be flat, the surfaces of the lips 262 converging rearwardly to sharp rear edges. The vanes 255 and 256 are preferably hollow and are constructed of heat-resistant material such as chromium-cobalt-nickel alloy or sintered ceramic-metal combination. The upper and lower walls of the nozzle opening 252 preferably have appropriately shaped flow directing surfaces or fairings 363 to divert or direct the upper and lower regions of the gas and air stream in a manner to flow smoothly over the cylindrical surfaces of the upper and lower nozzle vanes 256. It will be seen that with the nozzle structure thus far described the high velocity propulsive stream or jet is caused to flow through and discharge from the two passages 260 with a minimum of friction and loss and because of the thinness of the central lip 261 these two streams again merge into a single common high velocity or supersonic jet where they discharge from the opening 252, as indicated by the arrows in FIGURE 9.

The propulsive nozzle means 72 is operable to pivot or actuate the vanes 255 and 256 to vary or regulate the effective operational area of the nozzle in accordance with the propulsive jet flow conditions and to alter the direction of the discharging propulsive jet to effect a directional control of the craft. Further, the upper and lower vanes 256 are operable to positions where they form air brakes for reducing the speed of flight and the central vane 255 is utilized as a nozzle for discharging a stabilizing and trimming thrust jet during certain phases of the flight program. The means for operating the nozzle vanes includes horns or operating levers 263, fixed to the shafts 258 of the upper and lower vanes 256 and a similar lever 264 fixed on a trunnion 257 of the central vane 255, see FIGURES 19 and 20. A jack screw 265 is pivoted on the lever 264 and bi-directional electrical screwjacks 266 are pivoted on the levers 263 of the upper and lower vanes to receive and cooperate with the screw 265. The screw-jacks 266 may be of a conventional type including reversible electric motors driving traveling or rotating nuts meshing with the screw 265, such mechanisms being well known in the art. The screw-jacks 266 are operated or controlled by the positions of the shock waves and margins of the propulsive jet discharging from the nozzle 72. Pitot tubes 276 are secured to the lips 262 of the vanes 256 and have their pressure receiving ends spaced aft from the sharp trailing tips or edges of the lips and facing forwardly. Tubes or lines 267 carry the pressure thus received to pressure diaphragms 268. The diaphragms 268 in turn are operatively connected with spring biased pivoted levers 269 carrying contacts 270. These contacts 270 are connected in a power circuit 271 leading to a generator, battery or other electrical power source 272. The contacts 270 are each spaced between stationary contacts 273 and 274 connected by lines 275 and 277 respectively, with the forward and reverse windings or sides of their respective reversible electric screw-jacks 266.

The mechanism just described for actuating or controlling the vanes 256 of the nozzle means 72 is operable to automatically adjust or position the vanes 256 for the most efficient utilization of the compressed air and gas stream or jet under sonic, transonic and supersonic jet velocity conditions. The Pitot tubes 276 arranged as above described, are affected by or responsive to the positions of the margins of the jet stream discharging through the nozzle. When the velocity conditions are such that the jet of gases exhausting from the nozzle is underexpanded, the margins of the jet move outwardly at the surfaces of the vane lips 262, that is away from the central axis of the nozzle and increased pressure at these margins is sensed by the Pitot tubes 276. The broken line X in FIGURE 27 indicates diagrammatically the margin of an underexpanded jet stream as produced by the shock waves at the nozzle exit. On the other hand when the jet velocity conditions are such that the jet as it discharges from the nozzle 72 is overexpanded the margins of the jet move inwardly or toward the central axis of the nozzle. The broken Z in FIGURE 27 indicates diagrammatically a margin of the overexpanded jet as produced by the oblique reflection shock waves at the nozzle exit. It is to be understood that the particular full line positions of the vanes 256 in FIGURE 27 bear no operative or intended relation to the margins X and Z, the lines X and Z being entirely schematic. The automatic means for operating the nozzle vanes 256 employs or is sensitive to the movement of the margins of the exhausting gas stream jet to position the vanes 256 in accordance with the jet velocity conditions in order to most efficiently utilize the jet in the propulsion of the aircraft. Thus when the jet is underexpanded the margins of the jet move outwardly to apply increased pressure at the Pitot tubes 276 and this pressure acts on the diaphragms 268 to move the contacts 270 against the contacts 273. This in turn energizes the screw-jacks 266 to pivot the vanes 256 to swing their lips 262 outwardly and thus permit further expansion of the exhausting jet stream. However, when the discharging jet is overexpanded the margins of the jet move inwardly away from the surfaces of the vane lips 262 and the Pitot tubes 276 to lessen the pressure on the diaphragms 268 so that the contacts 270 engage the contacts 274. This energizes the screw-jacks 266 to swing the vane lips 262 inwardly into conformance with the margins of the jet. In practice during relatively stable or normal operating conditions the margins of the jet will move but little relative to the Pitot tubes 276 and the vanes 256 will be relatively stabilized. Referring to FIGURE 27 of the drawings the full line positions of the vanes 256 are the supersonic jet positions and the broken line positions M are the positions assumed by the vanes during supersonic jet operations of greatest jet velocity. It will be observed that with the upper and lower vanes 256 in the full line positions of FIGURE 7 the vanes define a convergent nozzle passage for the effective discharge and utilization of the subsonic propulsive stream or jet. However, with the upper and lower nozzle vanes 256 is the broken line positions M the fairings 363, the cylindrical upper and lower vanes 256 and their lips 262 define or provide a convergent-divergent nozzle passage or exit for the efficient utilization of the discharging supersonic propulsive jet.

The above described upper and lower nozzle vanes 256 are adapted to be used as dive brakes or air brakes to brake or reduce the translational speed and descent of the craft during certain maneuvers and in the event the speed of flight exceeds the maximum intended speed. The means for utilizing the vanes 256 as air brakes includes what I will term air speed indicators having Pitot tubes 280 arranged to extend from the body 10 to receive or respond to the relative air speed. Tubes 281 extend from the Pitot tubes 280 to air relays in the form of diaphragms 282 for biasing the switch levers 269 to cause the vanes 256 to move to the positions N. The diaphragms 282 are calibrated or constructed so that the switches or contacts 270 remain under sole control of the diaphragms 268 so long as the intended maximum indicated speed of flight is not exceeded. However, when this speed is exceeded the increased pressure received by the Pitot tubes 280 acts on the diaphragms 282 to actuate the same to close the switches 270 against the contacts 274. Closing of the switches 270 against the contacts 274 energizes the screw-jacks 266 to swing the vanes 256 to the fully extended positions indicated by the broken lines N in FIGURES 9 and 27. When the vanes 256 are in these positions N their lips 262 extend from the body 10 to project into the air stream or slip stream and act as effective air brakes to retard forward flight. The switches 270 may be constructed and arranged for manual operation by the pilot or engineer as well as by the diaphragms 282 and 268.

The three nozzle vanes 255 and 256 are operable to positions to deflect or divert the propulsive air and gas stream from the main propulsive duct 18 for the vertical directional control or pitch control of the craft. It will be observed that with the above described arrangement of the jack-screw 265 connected with the lever 264 of the central vane 255 and the screw-jacks 266 connected with the levers 263 of the upper and lower vanes 256, the screw-jacks may move the vanes 256 without altering the position of the intermediate vane 255. However upon angular movement of the central vane 255 the screw 265 and the jacks 266 transmit this movement to the upper and lower vanes 256 so that the three vanes move in unison and in the same direction. The means for utilizing the nozzle vanes 255 and 256 for direction or pitch control of the craft serves to pivot or move one of the vanes, for example the center vane 255, and includes a servo motor 285 for operating a drum 286. Cables 287 extend from the drum 286 and are attached to horns or levers 288 on one of the trunnions 256 of the central vane 255. The servo motor 285 is adapted to be controlled and energized by an automatic pilot 290 as are certain other devices and instrumentalities of the aircraft. In FIGURE 19 I have shown the automatic pilot 290 in a diagrammatic manner and have shown the control or energizing leads 289 for the servo motor 285 extending to the automatic pilot. Automatic pilots of the type controlled by ground station or airborne station radio signals are now well known in the art and any appropriate or selected type of automatic pilot may be used. A manual lever 291 is provided on the drum 286 so that the vanes 255 and 256 may be manually controlled or directed if such is desired or necessary. It will be seen that upon turning the drum 286 in one direction either by the action of the servo motor 285 or by the manual lever 291, the three vanes 255 and 256 are swung to positions where their lips extend downwardly to direct the propulsive jet downwardly and aft to exert a forward and downward pitching moment to the craft to move it downwardly. Upon turning the drum 286 in the other direction by the servo motor 285 or the hand lever 291 the vanes 255 and 256 are moved to positions where they extend upwardly and aft to direct the propulsive jet upwardly so that the craft is directed upwardly.

The nozzle means 72 is further utilized to discharge a pitch trim jet of compressed air to assist in stabilizing or trimming the craft during its vertical ascent and descent. The tail or lip 261 of the central nozzle vane 255 has a discharge opening 292 in its aft end or edge. This opening 292 is horizontally elongated and may extend throughout the length of the vane 255. The vane 255 is hollow and its interior and the interior of its lip 261 form an effective convergent nozzle terminating at the air discharging opening 292. A pipe 293 communicates with one of the lateral air ducts 130 and extends aft through the space 254 to the central vane 255. A swing joint or rotary coupling 294 connects the rear end of the pipe 293 with a trunnion 257 of the central vane 255 so that air under pressure from the duct 18 and the duct 130 is supplied to the interior of the vane 255. This air under pressure discharges from the opening 292 in the form of a propulsive and stabilizing or trimming jet. During vertical ascent and descent when the island 74 is vertically disposed or substantially vertical, the thrust produced by this jet of air under pressure discharging from the opening 292 trims the pitch angle of the craft and, if desired or necessary, the lever 291 or the servo motor 285 may be actuated to direct this trimming jet as conditions require to trim the craft during its vertical ascent and descent. Air under pressure from the ducted compressor 65 supplied to the interior of the central vane 255 as just described, may discharge from the opening 292 during all of the various phases of the flight program and at the times when the main propulsive jet is discharging from the nozzle means 72 the jet of compressed air from the opening 292 augments the main propulsive jet. It will be observed that the air under pressure circulated through and discharged from the central vane 255 serves to cool the vane.

My copending application, Serial Number 669,880, filed July 3, 1957, now Patent No. 3,038,305, covers the above described propulsive nozzle means.

As above described the reversible motors 140 are operable through the medium of the racks 138 and pinions 139 to rotate or turn their respective outboard powerplants 68 and 69 and thus control the direction of the propulsive jets discharging from their nozzle fittings 220. It is contemplated that the outboard load turbines or powerplants 68 and 69 are to be employed to obtain directional control of the craft during the phases of ascent and descent by turning the powerplants on their individual axes either correspondingly or differentially. Also, as above described, the motor 162 acting through the rack 160 and pinion 161 is operable to turn the island 74 between the position where the island duct 79 is aligned with the main propulsive duct 18 and the vertical position where the island is perpendicular to the duct 18 and the motor 162 is further operable to move the island 74 to positions where it is inclined upwardly and rearwardly relative to the longitudinal axis of the duct 18. The invention includes a switch means or mechanism for energizing the reversible electric motors 140 and the reversible motor 162 to effect these operations. This switch mechanism includes a gang switch, shown in FIGURE 20, embodying three double blades or double ended blades 295, 296 and 297, all connected in the power line 271. One arm or end of the blade 295 is engageable with a contact 298 and the other end of this blade is engageable with a contact 299. A conductor or lead 300 extends from the contact 298 to one side or winding of the reversible motor 162 and a lead 301 extends from the contact 299 to the other side of the motor 162. The blade 295 has a neutral position, where it is out of engagement with both contacts 298 and 299, a position where it engages contact 295 to energize the motor 162 to move the island 74 toward its normal position aligned with the duct 18 and a position where it engages contact 299 to energize the motor 162 to move the island toward its vertical position. One end of the switch blade 296 is engageable with a contact 302 and the other end of the blade is engageable with a contact 303. A lead 304 extends from contact 302 to one side of the motor 140 associated with the outboard powerplant 68 and a similar lead 305 extends from the contact 303 to the corresponding side of the motor 140 for turning the outboard powerplant 69. The blade 296 has a neutral position clear of both contacts 302 and 303 and a position where it engages the two contacts to effect turning of the powerplants 68 and 69 in one direction. The switch blade 297 is movable from a neutral position clear of any contacts to a position where it engages contacts 306 and 307 and electric leads 308 and 309 extend from the contacts 306 and 307 respectively to the other sides or windings of the motors 140 so that the motors are operable to turn or direct the powerplants 68 and 69 in the other direction. The gang of switch blades 295, 296 and 297 is operated by motors or solenoids 310, shown schematically in FIGURE 19, the energizing leads 311 extend from the automatic pilot 390 to the solenoids 310 so that the automatic pilot may control the positions of the island 74 and the outboard powerplants 68 and 69. Manual operating handles or levers 312 may also be provided to move or operate the gang of switch blades 295, 296 and 297.

The directional control system for the outboard powerplants 68 and 69 includes a differential switch operable to cause differential turning of the powerplants that is simultaneous rotation or angular movement of the powerplants in opposite directions. This switch, shown in FIGURE 20, has a double blade or double ended blade 313 electrically connected with the power line 271. The switch further includes two contacts 314 and 315 adapted to be simultaneously engaged by the blade 313 with the blade in one position. The contact 314 is connected in the lead 305 extending to one side of the motor 140 for turning the powerplant 69 and the contact 315 is connected in the lead 30 4extending to the other or non-corresponding side of the motor 140 for turning the powerplant 68. Thus when the blade 313 is in the full line position of FIGURE 20 the powerplant 68 is turned in one direction and the powerplant 69 is turned in the opposite direction. The differential switch further includes two contacts 316 and 317 adapted to be simultaneously engaged by the blade 313. The contact 316 is connected in the lead 308 extending to one winding or side of the motor 140 for turning the outboard powerplant 69 and the contact 317 is connected in the lead 304 extending to the opposite or non-corersponding side of the motor 140 for turning the powerplant 68. When the blade 313 is in engagement with the contacts 316 and 317 the motors 140 are simultaneously operated in opposite directions to adjust or turn the powerplants 68 and 69 in opposite directions. When the differential switch is operated the blades 295, 296 and 297 are in neutral positions. In a like manner when the gang switch is to be operated the blade 313 is in a neutral position. The differential or opposite turning or adjustment of the outboard powerplants 68 and 69 by the action of the switch blade 313 as just described, serves to bank the aircraft for and during turns, etc. and the blade 313 is preferably under the control of the automatic pilot 290, for example the gyroscopic means of the automatic pilot. As diagrammatically shown in FIGURE 19, the blade 313 is operated by motors or solenoids 320 connected with the automatic pilot 290 by leads or conductors 318 and 319.

The invention includes a fuel control system for the several propulsive units of the propulsion system, this fuel control means serving to supply fuel to the driving turbines or powerplants 66, 67, 68 and 69, to the fuel pumping and injecting spinner 166 of the combustor means 70 and to the regenerator shell 176 of the combustor means 70 in a sequential or related manner to most effectively follow a flight program for the craft. The aircraft may, of course, be operated in accordance with various flight programs and the fuel control system may be appropriately varied or altered to provide for such operation. As herein disclosed the fuel control system is designed to effect vertical ascent from the field or ground, a climb at a flight path angle of, say, 10 degrees to about 10,000 ft. altitude, a further climb at a flight path angle of, say, 20 degrees and at increased speed to about 50,000 ft. altitude, acceleration through the transonic range of from Mach No. .83 to Mach No. 1.32 at this altitude, flight to about 100,000 ft. altitude at diminishing acceleration, level flight at a Mach No. of about 4 at the 100,000 ft. altitude and then descent and deceleration to the point of landing at the ground or field. This program is initiated by first supplying fuel to the outboard load turbines 68 and 69, the island 74 containing the ducted compressor being in its vertical or 90° position at this time, and the powerplants 68 and 69 being turned or directed to assist in the vertical lift of the aircraft and in providing whatever directional control is necessary. The air under pressure discharging from the opening 292 of the nozzle 72 assists in stabilizing the vertical ascent. The means for supplying fuel to the outboard powerplants 68 and 69 includes the abovementioned pipes 222 conveying the fuel to the combustors 213 of the powerplants 68 and 69 and valves 320 in these fuel pipes. The valves 320 are operated by solenoids 321 having energizing leads 322 extending to stationary contact strips or buses 323, see FIGURE 20. The contact strips 323 constitute elements of a variable resistance device for individually regulating the valves 320 to provide for operation of the outboard powerplants 68 and 69 at different speeds or thrust output to obtain directional control of the craft in flight. Each contact strip 323 has associated therewith a resistance 326 and two blades 324 connected to turn in unison are operable to move along the contact strips and their respective resistances. As shown in FIGURE 19, a servo motor 325 is operable to turn the blades 324. Electrical leads 327 for energizing the servo motor 325 extend to the automatic pilot 290 so that the automatic pilot is operable to regulate the powerplants 68 and 69 for directional turn and roll control of the aircraft. A manual handle 328 may be associated with the shaft of the servo motor 325 to permit manual actuation or adjustment of the blades 324. The blades 324, the contact strips 323, and the resistances 326, are related so that the blades may simultaneously contact both strips 323 so that there is little or no resistance added to the circuits of the solenoids 321. Upon turning the blades 324 in one direction one blade remains in cooperation with its respective contact strip 323 to supply full current to the solenoid 321 of the powerplant 68 but the other blade 324 is moved a greater or lesser distance along its related resistance 326 to reduce the flow of current to its related solenoid 321 and thus reduce the delivery of fuel to the powerplant 69. However, upon turning the blade 324 in the other direction one blade merely moves along its contact strip 323 to continue to deliver full current to the solenoid 321 of the fuel valve 320 for the powerplant 69 but the other blade 324 moves along its related resistance 326 to reduce the current flow to the solenoid 321 of the fuel control valve 320 for the powerplant 68 so that fuel is delivered to the powerplant 68 at a reduced rate. It will be seen that by differentially regulating the fuel consumed at the powerplants 68 and 69 with or without altering the angular positions of the powerplants effective directional control of the aircraft is obtained.

The fuel control system for the outboard load turbines or powerplants 68 and 69 further includes a pivoted or turnable contact wheel 330 having a plurality of spaced radially projecting spokes or points 331, one of which carries a contact 332. Contact 332 is cooperable with a stationary bus 335 having a resistor 334 extending from one end. A lead 336 extends from the other end of the bus 335 to the blades 324. A power line 333, a portion of which is flexible, connects with the contact 332. So long as contact 332 engages the extremity of resistor 334 little or no current is supplied to the solenoids 321. However as the wheel 330 is turned to move the contact 332 along the resistor and onto the bus 335 increased and then full current is supplied to the solenoids 321 to open the fuel valves 320 of the outboard load turbines 68 and 69. A temperature responsive control device D is interposed in lead 333 as will be later described. As the programming wheel 330 is instrumental in effecting operation of several elements of the aircraft during the flight program, I will describe the operation of the several propulsive units and other elements of the craft as the description of the programming wheel 330 and associated parts progresses.

Preparatory to taking off the fuel pipes 41 and 42 are connected with their fittings 37 and 38 so that fuel is pumped into or delivered to the fuel cells 32 with a continuous withdrawal of vapor from the cells until actual take-off. The automatic pilot 290 is operable to cause actuation of the island 74 to the vertical position where its nozzle 81 faces downwardly and to turn the powerplants 68 and 69 to have their fittings 220 discharge downwardly. With the hatches 30 closed and the flight personnel and passengers in their seats or stations, the ignitors 223 are energized and the craft is otherwise prepared for flight. The programming wheel 330 is turned to move the contact 332 along the resistor 334 and on to the bus 335 to open the fuel valves 320. The wheel 330 carries a second contact 338 connected with the power lead 333 and adapted to move along a resistor 340 and then on to a bus 341. An electrical lead 342 extends from the end of the bus 341 which is most remote from the resistor 340 to the blades 343 of a differential resistor device similar to or identical with the device 323—324—326, described above. The blades 343 are operated by a servo motor 344 connected with the automatic pilot 290 by energizing leads 345 and a manual lever 346 may also be provided to operate the contact blades 343. Leads 348 extend from the busses 347 of the differential resistance device to the solenoids 350 for operating the fuel valves 351 controlling the fuel pipes 122 supplying fuel to the combustion chambers 113 of the inboard load turbines or powerplants 66 and 67. The parts are related so that when the contact 332 of the wheel 330 moves from the resistor 334 onto the bus 335 to bring about full or substantially full power output of the outbroad powerplants 68 and 69, the contact 338 moves onto the resistor 340 to energize the solenoids 350 to crack or partially open the valves 351. The ignitors 123 are energized at this time so that the fuel is ignited in the combustion chambers 113 to initiate idling operation of the inboard powerplants 66 and 67. As the programming wheel 330 is further advanced in the clockwise direction contact 338 moves along the resistor 340 toward the bus 341 and then moves onto the bus so as to gradually increase current flow to the solenoids 350 and therefore gradually increase the supply of fuel to the power plants 66 and 67 to full or substantially full power output. As the island 74 is in the vertical position at this time, that is at approximately 90° to the longitudinal axis of the duct 18, the discharge fittings 120 and vanes 121 of the powerplants 66 and 67 face or discharge downwardly. Thus the propulsive jets of the inboard powerplants 66 and 67 as well as those of the outboard powerplants 68 and 69 are directly downwardly to provide vertical lifting forces for lifting the craft from the ground or field.

The programming contact wheel 330 has a third contact 352 on a point 331 engageable with a resistor 353 and a bus 358 associated with the resistor. A lead 354, a portion of which is flexible, connects the contact 352 with the power line 333 through the medium of the temperature responsive control device D to be later described. A lead or wire 355 extends from the bus 358 to a motor or solenoid 356 which operates a valve 357 controlling the fuel pipe 155 supplying fuel to the fuel injecting spinner 166 associated with the ducted compressor 65. After the contact 338 of the programming wheel 330 has moved some distance along the bus 341 further turning of the wheel 330 in the clockwise direction brings the contact 352 into engagement with the resistor 353. This causes opening of the valve 357 and fuel is discharged into the island duct 79 to be ignited therein by the ignitor 175. Continued movement of the wheel 330 in the clockwise direction brings the contact 352 into cooperation with the bus 358 and the valve 357 is opened to admit substantially full volume fuel to the afterburner spinner 166 of the ducted compressor 65. As the load turbines or powerplants 66, 67, 68 and 69 are at this time in full operation they drive the ducted compressor 65 through the transmission means above described. The ducted compressor 65 serves to move a large mass of air through the island duct 79 at a substantial velocity and at high pressure and the fuel from the spinner 166 is burned downstream from the compressor to greatly increase the propulsive thrust produced by the blast or jet discharging from the island nozzle 81. This propulsive jet is directed downwardly and serves to augment the propulsive thrusts from the discharge fittings of the powerplants 66, 67, 68 and 69. The combined thrust output of the ducted compressor 65 with its afterburner, and the powerplants 66, 67, 68 and 69 is sufficient or more than sufficient to cause susbtantially vertical ascent or takeoff of the craft. Immediately upon takeoff the fuel hoses or pipes 41 and 42 are automatically disconnected from the aircraft as above described. The craft may be operated vertically a suitable distance, say 150 ft. and the landing gear 53 is retracted as the craft rises from the ground. During the vertical ascent the compressed air under pressure discharging from the opening 292 of the nozzle vane 255 serves as a pitch trimming stream or thrust jet and although not ordinarily required the blades 343 and/or the blades 324 may be operated either manually or by the automatic pilot 290 to produce differential operation of the powerplants 66 and 67 and 68 and 69 to obtain pitch differential control and turn or bank differential control respectively.

Upon reaching 150 ft. or thereabouts, the island 74 is turned by energizing the motor 162 to an angle of about 60° for a few seconds to effect a transition from vertical ascent to translational climb. The automatic pilot 290 acting through the solenoids 310 operates the switch blade 295 to bring about this turning of the island 74 and the powerplants 68 and 69 may be turned correspondingly by the action of their related switch blades 302 and 297 also actuated by the solenoids 310. The contact wheel 330 is then turned back or in the counter-clockwise direction to move the contact 352 out of engagement with the bus 258 and resistor 353 but this movement of the wheel is limited so as to retain the contacts 338 and 332 in engagement with their respective busses 341 and 335. At about the same time the island 74 is turned by energization of the motor 162 to the position where its duct 79 is aligned with the duct 18 of the body 10 and the powerplants 68 and 69 are turned by energizing their respective motors 140 to have their vanes 221 and fitting 210 face generally rearward. This is done by the pilot or the automatic pilot 290 operating the servo motors or solenoids 310 to actuate the switch blades 295, 297 and 302. With the island 74 in this position the powerplants 66 and 67 produce rearwardly directed propulsive jets and the outboard powerplants 68 and 69 also produce rearward propulsive jets. Furthermore, the ducted compressor 65 is driven by the powerplants 66 to 69 inclusive to produce a propulsive jet of compressed air which discharges rearwardly through the nozzle 72. Thus the craft is propelled forwardly at a substantial velocity, say at a speed of from 112 to 880 ft. per second, being accelerated during this initial climb. The nozzle vanes 255 and 256 actuated by the servo motor 285 as controlled in turn by the automatic pilot 290 may maintain a flight path angle of, say, 10° until an altitude of about 10,000 ft. is reached whereupon a flight path angle of about 20° is maintained until an altitude of about 50,000 ft. is reached.

In accordance with the specific flight program being described the craft is accelerated through the transonic speed range at about the 50,000 foot altitude. During flight or climb from 30,000 to 50,000 ft. the afterburner or spinner 166 of the ducted compressor 65 may be supplied with fuel by the action of the automatic pilot 290 advancing the programming wheel 330 in the clockwise direction to move the contact 352 along the resistor 353 to open the valve 357 to some extent. When the craft is to be accelerated through the transonic range, say from a Mach number of .83 to a Mach number of 1.32, the programming wheel 330 is advanced by the action of the automatic pilot 290 to move the contact 352 on to the bus 358 so that a full volume of fuel is supplied to the fuel injecting spinner 166. The resultant additional thrust obtained by the burning of this fuel in the compressed air duct downstream from the ducted compressor 65 accelerates the craft through the transonic range. The flight path angle of the craft may be 0° at this time and upon reaching supersonic velocities the flight path angle may be maintained at about 10° to an altitude of 70,000 ft. and from 70,000 to 90,000 ft. the flight path angle may be about 2° with a lesser angle being maintained up to the 100,000 foot altitude.

In accordance with the invention the speed of the load turbines or powerplants 66 to 69 inclusive, is modulated or controlled in such a manner that these engines operate at idling speeds, for example at not more than 19% of normal speed, when the craft reaches a velocity of Mach Number 4 at the 100,000 ft. altitude. With the craft operating at this velocity and altitude, it is propelled substantially entirely by a ram jet action, the fuel being burned in the main duct system 18—79 behind or downstream from the ducted compressor 65 and in the highly ram compressed air flowing through the duct system and discharging from the nozzle 72 as the main propulsive jet. The abovementioned device D constitutes the means for controlling or modulating the speed of operation of the load powerplants 66–69 inclusive. The device D is responsive to the temperature of the ram compressed air in the duct 18 downstream from the ram inlet 71. A temperature responsive device, for example a curved bi-metal thermostat element 360 is arranged in the duct downstream from the inlet 71. The element 360 is subjected to the ram air temperature and is operatively connected with a pivoted electrical conducting arm 362 by appropriate linkage 361. As noted above, the device D is interposed in the power line 333 and the pivoted end of the arm 362 is electrically connected to the portion of the line 333 extending to the power source 272. An arcuate or curved resistor 364 has one end connected with the portion of the power line 333 extending to the contacts 332 and 338 which, as above described, control current flow to the solenoids 350 and 321 for regulating fuel flow to the powerplants 66 to 69 inclusive. With a relatively low temperature prevailing in the ram inlet portion of the duct 18, say a temperature of about 120° F., the thermostat element 360 holds the arm 362 at the end of the resistor 364 adjacent the power line 333 so that there is substantially full current flow through the lead 333 to the contacts 332 and 338 and therefore to the fuel valve operating solenoids 350 and 321. As the temperature of the ram compressed air increases the arm 362 is moved outwardly along the resistor 364 by the action of the element 360 to increase the resistance in the circuits and to proportionately reduce the flow of fuel to the powerplants 66 to 69 inclusive. With the craft flying at a Mach number 4 and at approximately 100,000 ft. altitude, the temperature of the rammed air in the forward portion of the duct 18 is relatively high, being about 1100° F. At such a temperature the bi-metal element 360 will have moved the arm 362 along the resistor 364, a distance to reduce the current flow to the solenoids 321 and 350 to the extent that the powerplants 66 to 69 inclusive operate at about only 19% normal speed, in effect merely idling, with a relatively small amount of fuel being consumed in the streams of compressed air flowing through them. Under such conditions the ducted compressor 65 is windmilling or driven at a relatively low speed by the highly ram compressed air flowing through the duct 18. Further, under such conditions, the inlet ram island 202 is expanded or inflated to a condition, such as illustrated in full lines in FIGURE 12, for the most effective supersonic air admission and ram compression effect, the island 202 being operated or inflated in the manner above described.

In addition to the control or modulation by the device D, as just described, the fuel valves 321 and 351 of the powerplants 66 to 69 inclusive, are controlled by individual temperature responsive means which prevents excessive high speed operation of the powerplants during the flight or climb of the craft to the 100,000 ft. altitude and at all other times. The solenoids 321 and 350 are grounded by lines 364, see FIGURE 16. The temperature responsive device of the powerplant 68 is clearly illustrated in FIGURE 16 and will now be described, it being understood that this description is applicable to the temperature responsive devices of the other plants 66, 67 and 69. The temperature responsive control device of the powerplant 68 includes a pivoted conducting arm 365, having a portion of the ground line 364 connected therewith and extending to ground. The arm 365 is movable along a curved resistor 366 which has one end connected to the portion of the ground line 364 extending to the related solenoid 321. The arm 365 is operatively connected with a temperature responsive or thermostatic element 367 projecting into the combustion chamber 213 of the powerplant 68. The parts are related so that during operation of the powerplant at relatively low temperatures, or normal temperatures, the arm 365 remains in engagement with the inner portion of the resistor 366 to add a minimum of resistance to the circuit of the solenoid 321. As the operating temperature of the powerplant 68 increases, the element 367 moves the arm 365 outwardly along the resistor 366 to increase the resistance in the circuit of the related solenoid 321. When the operating temperature of the powerplant 68 reaches a predetermined upper limit, the arm 365 will have been moved to an outer position on the resistor 366 where the current flow through the solenoid 321 is reduced appreciably to proportionately reduce the fuel flow to the powerplant, the valve 320 in the fuel line being closed down substantially by the solenoid to reduce the fuel flow into the powerplant.

Returning now to the programming contact wheel 330, illustrated in FIGURE 20, it will be seen to have a fourth contact 368. The contact 368 is connected with the line 354 above described, and is engageable with a stationary resistor 370. A line 371 extends from an end of the resistor 370 to a solenoid 372 controlling or operating the valve 183 in the fuel line 182 which extends to the regenerator space 178 around the aft portion of the main air duct 18. The parts are related so that contact 368 engages the resistor 370 when the wheel 330 is moved in the clockwise direction with the contact 352 moving along the bus 358 of the energizing circuit for the solenoid 356 of the fuel valve 357 supplying the afterburner spinner 166. Upon the contact 368 engaging the resistor 370 the valve 183 is opened to admit the liquid fuel to the regenerator space 178 for discharge radially from the ports 184 into the main propulsive duct 18. The liquid fuel flowing forwardly through the space 178 from the pipe 182 to the ports 184 cools the walls of the duct 18 to protect them against damage by the high temperatures and the fuel is vaporized as it flows forwardly through the space to be discharged as vapor from the ports 184. It will be noted that the heat energy absorbed by the fuel as it cools the duct walls and as it is vaporized is reintroduced into the propulsive duct system thus providing a regenerative effect. In practice the contact 368 of the programming wheel 330 cooperates with the resistor 370 to open the valve 183 and thus provide for the injection of fuel vapor from the ports 184 during the latter phases of the climb of the craft to the operational altitude of 100,000 ft. and if desired this may be made to occur before or shortly after the transition to the supersonic velocity.

During the ascent and climb of the craft the fuel in the tanks or cells 32 is vaporized to some extent and provision is made to bleed the fuel vapor from the cells 32 at this time and more particularly after high speed and relatively high altitudes have been attained. This means includes a vapor pipe system or manifold 373 having communication with the upper portion of each fuel cell 32, see FIGURE 17 and FIGURE 20. The pipes 373 may extend directly to the aft portion of the regenerator space 178 and have a poppet valve 374 for each fuel tank 32. The valves 374 are set to open at a given fuel tank vapor pressure, say at 1 p.s.i. The pressure required to open the valves 374 will not ordinarily develop until the craft has climbed to a substantial altitude at which time fuel vapor discharges into the regenerator space 178 and the duct 18 to be burned with the fuel injected by the spinner 166 when the latter is in operation.

When the craft is flying at the operational altitude there may be a tendency for the flight velocity to exceed the design air speed of four times the speed of sound, particularly if the airplane has been in flight for some period of time, and has therefore decreased in total weight. An operation speed substantially exceeding the exemplary design speed of four times the speed of sound would decrease the total range and would cause the skin temperature to rise above design limits. Although the nozzle vanes 255 and 256 will be actuated to the air brake positions N under circumstances exceeding the placard speed of 450 knots indicated (for gust protection) by the action of the Pitot tubes 280 and relays 282 to retard the flight speed during descent, it is desirable to first reduce the fuel consumption at the combustor means 70 so that the nozzle vanes, acting as air brakes will never be obliged to absorb the excessive thrust energy produced by the propulsive system. To this end the above described device D incorporates means for reducing the fuel delivery to the spinner 166 and regenerator ports 184 under such circumstances. The above described contacts 352 and 368 of the programming wheel 330 are supplied with power by a lead 376, a portion of which is flexible to permit rotation of the wheel. The line 376 extends to a bus 377 which is concentric with the resistor 364 of the device D. The outer end of the bus 377 has a resistor 378 extending therefrom and the pivoted arm of the device D has a slider or contact 379 engaging and movable along the bus and resistor. When the temperature of the ram compressed air in the forward portion of the duct 18 exceeds the temperature that should prevail at the maximum air speed at the operational altitude (100,000 ft.), the thermostatic element 360 moves the arm 362 to the position where the contact 379 engages the resistor 378. This introduces substantially increased resistance in the circuits of the solenoids 356 and 372 which respectively control the fuel valves 357 and 183 of the fuel injecting spinner 166 and regenerator 178. This increased resistance causes the valves 357 and 183 to be closed down sufficiently to reduce the propulsive thrust to the extent that the flight velocity is retarded to the desired limit or speed. When the ram air temperature returns to the normal value the contact 379 moves back onto the bus 377 and the valves 357 and 183 are opened wider.

During the flight or climb to the operational altitude of about 100,000 ft. and during the translational flight at this altitude, the nozzle vanes 255 and 256 are operated to provide the required pitch control and the powerplants 68 and 69 are turned and/or operated at differential speeds to produce turning and banking or directional control, the automatic pilot 290 actuating the related servo motors, etc. to effect actuation of these and the other controls to direct the flight of the craft, all as above described. In event of over-speeding of the craft the Pitot tubes 280 and the related air relays 282 serve to actuate the jacks 266 to move the nozzle vanes 255 and 256 to the air brake positions N, the device D serving to modulate the propulsive fuel supply in the event of any sustained over-speeding, as described above. The nozzle vanes 255 and 256 of the propulsive nozzle 72 are automatically moved or actuated by the screw-jacks 266 as controlled by the diaphragms 268 and switches 270—273—274 which, in turn, are responsive to the marginal shock wave pressures of the jet as received by the Pitot tubes 276, the vanes 255 and 256 being at all times actuated to the positions where they most efficiently discharge the subsonic and supersonic jet, as the case may be. During the flight the compressed air bled from the lateral ducts 130 by the pipes 188 passes through the intercoolers 187 and discharges into the passenger compartments 20, 25 and 27 to maintain comfortable air temperature and air pressure conditions in the compartments. The low boiling point fuel is circulated through the intercoolers 187 under the control of the thermostats 193 and the valves 192 to cool the cabin pressurizing air.

When the craft approaches its destination the automatic pilot 290 actuates the programming contact wheel 330 in the counterclockwise direction to a position where the delivery of fuel to the fuel injecting spinner 166 and the regenerator space 178 is terminated, and where the contacts 334 and 338 cooperate with their respective resistors 334 and 340 to provide for the limited delivery of fuel to the powerplants 66 to 69 inclusive. The propulsive nozzle vanes 255 and 256 and the outboard powerplants 68 and 69 are moved or directed by the action of the automatic pilot 290, as above described, to nose the aircraft down and to land the same. During the descent the powerplants 68 and 69 are operated at just sufficient speeds to obtain the required directional and trimming control and the ducted compressor 65 is idle, merely windmilling in the rammed air flowing through the duct 18. The nozzle vanes 255 and 256 may move to their dive-brake or air brake positions N to retard the descent. The craft may, if desired, be landed in much the same way as a conventional aircraft so as to make a generally horizontal approach to the field and the actual touchdown or landing while moving forwardly. However, it is preferred, in order to economize on fuel and save time, to effect a vertical landing. This is done by moving the island 74 to the vertical position where the nozzle 81 faces downwardly and swinging the powerplants 68 and 69 to positions where their discharge fittings or nozzles 220 face downwardly. Fuel is supplied to the spinner 166 and to the powerplants 68 and 69 in sufficient volumes to provide a considerable aggregate upward thrust so that the craft may be landed vertically slowly while in the horizontal attitude, the programming wheel 330 being operated by the automatic pilot 290 or by flight personnel to obtain this action. The landing gear 53 is extended to engage the field at the touchdown and to thereafter support the aircraft on the field and the propulsive system is shut down to terminate the flight.

FIGURES 21, 22 and 23 illustrate another aircraft of the invention characterized by a turbo-propeller powerplant 400 serving as the primary propulsive means. In this aircraft the body 10, the duct 18, the ram inlet 71, the propulsive nozzle 72, the regenerator means 176—178—184, the control systems and various other parts may be the same as above described. The central island 474 is substantially the same as the island 74 of the previously described aircraft except that it is shaped and proportioned to conform with and contain the powerplant 400. The island 474 is arranged to be turned or pivoted on the spanwise axis of the body 10 in the same manner as the island 74. The trunnions 482 for pivotally supporting the island 474 are tubular to supply compressed air from the powerplant 400 to lateral ducts 430 which carry it to outboard directional nozzles 420. These nozzles 420, which turn or move in curved slots 401 in the periphery of the body 10, are rotated or pivoted by reversible electric motors 440 driving pinions 437 which mesh with racks or gears 438 fixed on the nozzles. The motors 440 may be controlled in the same manner as the motors 140 described above to produce turning and banking of the aircraft. It will be seen that operation of the motors 440 serve to swing the nozzles 420 to various positions, the nozzles being adapted to be directed upwardly, downwardly and rearwardly.

Provision is made to burn fuel in the compressed air streams immediately ahead of the directional nozzles 420. The outboard ends of the ducts 430 are enlarged to form combustion chambers 402 and fuel injectors 403 discharge fuel into these chambers, see FIGURE 23. Ignitors 473 are provided to ignite the fuel in the chambers. Fuel pipes 422 corresponding to the above described pipes 222 carry the fuel to the injectors 403. The nozzles 420 are operable to discharge propulsive and directional jets of high temperature compressed air and the gases of combustion.

The powerplant 400 may be the same as the powerplant disclosed in my earlier Patents 2,563,270, granted August 7, 1951, and 2,575,682, granted November 20, 1951. The powerplant 400 has a streamlined rather bulbous casing 410 provided at its forward end with an air inlet 411 and at its rear end with a variable area nozzle 412. The island 474 is shaped to conform with the casing 410, receiving the same with substantial clearance to leave an annular duct 413 around the casing. As described in the above identified patent, the powerplant 400 has a compressor means 414, a combustion chamber 415, and turbine stages 416 all contained within the casing 410. The turbine stages 416 drive the compressor means 414 and a propeller 417 positioned ahead of the casing. The gases of combustion and the residual compressed air discharge from the nozzle 412 as a propulsive jet, this jet flowing rearwardly through the duct 18 to issue from the propulsive and directional nozzle 72. The powerplant nozzle 412 is temperature and pressure responsive to automatically discharge the most efficient jet under the various operating conditions of the powerplant. The compressor or propeller 417 is ducted, operating in the duct 413 which is shaped to have a rearwardly convergent-divergent throat in the region of the propeller. The propeller 417 serves to compress the air in the duct 413 to supercharge the compressor means 414 of the powerplant 400 and to increase the pressure of the air discharging through the duct 413, duct 18, and nozzle 72. During translational flight the rammed air received by the ram inlet 71 and flowing through the duct 18 is further compressed by the propeller 417 to flow around and through the powerplant 400 and the powerplant provides a high temperature high velocity jet which, together with the compressed air, discharges through the duct 18 and nozzle 72 to form the primary propulsive jet of the craft. The vaporized fuel discharging from the ports 184 provides augmented or additional thrust and the compressed air bled from the compressor means 414 of the powerplant 400 through struts 419 and the ducts 430 is reheated and discharged from the outboard nozzles 420 to provide additional propulsive thrust. For vertical ascent and descent the island 474 is turned to the vertical position where the nozzle 412 and the rearwardly convergent end of the duct 413 faces downwardly and the outboard nozzles 420 are likewise turned to face downwardly to provide the upward or lifting thrusts.

The aircraft of the invention illustrated in FIGURES 25 and 26 is characterized by two or more turbo-jet powerplants 500 in the central pivoted island 574 driving ducted propellers or compressors 565 and constituting the primary propulsive means of the aircraft. The body 10, the duct 18, the ram inlet 71, the propulsive and directional nozzle means 72, the regenerator 178, the control system and the various other elements may be the same as described above. The plurality of powerplants 500, serves to drive a pair of counter-rotating fans or compressors 656 operating in the duct 579 of the pivoted island 574. The powerplants 500, the operative relationship between the powerplants, the compressors or propellers 565 and the drives between the powerplants and the propellers for driving the latter may be the same as disclosed in Patent 2,613,749 granted to me October 14, 1952. As in the other forms of the present invention the island 574 is pivotally supported by tubular trunnions 582 to turn about a spanwise axis. The trunnions 582 receive compressed air from pipes 502 extending from the compressors of the powerplants 500 and supply this compressed air to spanwise ducts 530 extending to the outboard peripheral regions of the body 10 where they communicate with the propulsive and directional discharge nozzles 420, already described. In this case, if desired, the combustion chambers 402 may be omitted from the outboard nozzle assemblies. The powerplants 500 are each self-contained turbo-jet engines including compressors receiving the rammed compressed air from the island duct 579, combustion chambers, turbines, and exhaust nozzles 512. The turbine stages of the powerplants 500 drive the compressor stages of the powerplants and also drive forwardly extending shafts 503 which extend to a gear box 504 at the propellers or compressors 565. The gear box 504 provides for the counter-rotation of the compressors 565. All of these elements are described in Patent 2,613,749. The counter-rotating compressors 565 operating in the island duct 579 to further compress the rammed compressed air flowing therethrough, supercharge the powerplants 500 and provide an effective propulsive stream which discharges from the nozzle 72. The jets of high velocity, high temperature gases and air discharging from the nozzles 512 of the powerplants 500 augment this propulsive stream and the fuel vapor injected at the ports 184 and burned downstream from the nozzles 512, further augments the propulsive effect for translational flight of the aircraft. The aft portion of the island duct 579 has a rearwardly convergent nozzle 581. For vertical ascent and descent the island 574 is turned to the vertical position where the nozzle 581 faces downwardly and the outboard nozzles 420 are likewise directed downwardly so that the propulsive jets issuing from the island duct 579 and the nozzles 420 provide the necessary upward thrust for vertical rising and controlled vertical descent of the craft.

It will be observed in the aircraft illustrated in FIGURES 21 to 26 inclusive, the ducted compressors 417 and 565 are driven by turbo powerplants contained within the central pivoted island and that the above described inboard and outboard load turbo powerplants 66 to 69 inclusive, may be dispensed with. Furthermore, in the aircraft shown in FIGURES 21 to 26 the propulsive jets issuing from the discharge nozzles 412 and 512 of the powerplants augment the main propulsive stream of compressed air flowing through the central duct 18 and issuing from the propulsive and directional nozzle 72. The compressors 417 and 565 serve to supercharge and supplement the compressors of their respective powerplants 400 and 500. In certain installations or aircraft these compressors 417 and/or 565 may either be omitted or operated within the casings of the powerplants 400 and 500 providing pure turbo-jet engines within the diametric propulsive ram jet duct system.

Having described only typical forms of the invention I do not wish to be limited to the specific details herein set forth, but wish to reserve to myself any variations or modifications that may appear to those skilled in the art and fall within the scope of the followings claims.

I claim:

1. In a vertical rising aircraft, an aircraft body having a propulsive air duct extending fore and aft therethrough and having a vertical opening intersecting the duct, an island in the opening comprising a shell and a duct extending therethrough, means supporting the island on the body for movement in said opening between a first position where the island duct is in registration with the air duct to constitute an operative portion thereof and a second position where the island duct is vertical and substantially normal to the air duct with its upper end in communication with the atmosphere at the upper side of the body and with its lower end discharging into the atmosphere at the under side of the body, the shell including upper and lower walls which are substantially flush with the upper and lower sides of the body when the island is in said first position, propulsive means in the island duct for producing a high velocity propulsive airflow therethrough, and means for moving the island to the vertical position where the propulsive means creates a downwardly directed propulsive stream for exerting a lifting thrust to raise the craft.

2. In a vertical rising aircraft, an aircraft body having a propulsive air duct extending fore and aft therethrough and having a vertical opening intersecting the duct, a generally rectangular island in the opening having side walls conforming to the walls of said vertical opening, upper and lower walls, spaced ends and a duct adapted to register with the air duct and extending between said ends, means supporting the island on the body for movement in the opening about a spanwise axis between a first position where the island duct is in registration with the air duct to form an operative part thereof and a second position where the island duct is vertical with its upper end in communication with the atmosphere at the upper side of the body and with its lower end discharging into the atmosphere at the under side of the body, said upper and lower walls being generally flush with the upper and lower sides of the body when the island is in said first position, and propulsion means in the island duct for producing a high velocity and high temperature air and gas stream through the island duct to create a lifting thrust when the island is in the second position and a forward thrust when the island is in the first position.

3. In a vertical rising aircraft, an aircraft body having a propulsive main duct extending fore and aft therethrough and having a vertical opening intersecting the duct, an island in the opening having a duct adapted to register with the main duct, means supporting the island for movement in the opening about a spanwise axis between a first position where the island duct is aligned with the main duct and a second position where the island duct is vertical, a propulsive nozzle at the aft end of the main duct, propulsive means in the island for producing a propulsive stream of air and gases through the island duct to exert a lifting force when the island is in the second position and to provide a propelling jet discharging from the nozzle when the island is in the first position, powerplant means carried by the aircraft body, and drive means operatively connecting the powerplant means with the propulsive means to drive the same.

4. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening, the island including a shell structure having spaced sides conforming to the fore and aft walls of the vertical opening, upper and lower walls and spaced ends and a duct extending through said structure to have its opposite ends at said ends of the structure, the island duct being adapted to register with the main duct, means in the island duct for compressing the air flowing therethrough and for supplying heat energy to the compressed air to create a high velocity high temperature propulsive gas stream, means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight, and parts on the main duct and the opposite ends of island duct cooperating to prevent the loss of said stream when the island is in the second named position.

5. An aircraft comprising an aircraft body having a main propulsive duct extending therethrough in the fore and aft direction and having a vertical opening intersecting the duct, a ram inlet at the forward end of the main duct, a propulsive nozzle at the aft end of the main duct, an island pivotally supported in the opening and having a duct extending therethrough adapted to register with the main duct so that the two ducts together constitute a through fore and aft passage in the body, means in the island duct for compressing the air flowing therethrough and for supplying heat energy to the compressed air to create a high velocity high temperature propulsive gas stream, at least one turbo engine in the island at the exterior of the island duct for driving said compressing means, and means for pivoting the island to a vertical position where the island duct is out of register with the main duct and discharges said stream downwardly from the underside of the body to exert a lifting thrust to lift the body vertically and then to a position where the island duct is in register with the main duct to direct said stream rearwardly through the main duct to discharge from the nozzle and provide a forward thrust for translational flight.

6. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high propulsive gas stream comprising a compressor in the island duct and afterburner means downstream from the compressor, powerplant means carried by the island externally of the island duct for driving the compressor, and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight.

7. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct extending therethrough adapted to register with the main duct so that the two ducts together constitute a through fore and aft passage in the body, means in the island duct for compressing the air flowing therethrough and for supplying heat energy to the compressed air to create a high velocity high temperature propulsive gas stream, means for pivoting the island in the opening to a vertical position where the island duct discharges said stream downwardly from the underside of the body to exert a lifting thrust to lift the body vertically and then to a position where the island duct registers with and in effect forms a part of the main duct to discharge said stream rearwardly through the main duct to discharge from the nozzle and provide a forward thrust for translational flight, and means for injecting the burning fuel in the main duct downstream from the opening when the island is in the last named position.

8. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high temperature propulsive gas stream comprising a compressor operating in the island duct, and afterburner means in the island duct downstream from the compressor, at least one gas turbine powerplant on the island external of the island duct for driving the compressor, and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight.

9. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high temperature propulsive gas stream comprising a compressor operating in the island duct, and afterburner means in the island duct downstream from the compressor, turbo-jet engines on the upper and lower sides of the island having propulsive nozzles facing aft when the island duct is in register with the main duct, driving connections between the engines and the compressor, and means for pivoting the island to a vertical position where nozzles of said engines and the island duct discharge downwardly from the underside of the body to exert lifting thrusts to lift the body vertically and then to a position where the island duct discharges said stream rearwardly through the main duct to discharge from the nozzle and where the nozzles of said engines discharge rearwardly to provide forward thrusts for translational flight.

10. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high propulsive gas stream comprising a compressor in the island duct, afterburner means downstream from the compressor, a discharge nozzle for said duct of the island, and powerplant means external of the island duct for driving the compressor, and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight.

11. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high temperature propulsive gas stream, said means including a compressor operable in the island duct, and afterburner means downstream from the compressor, turbo-jet engines on the body outboard from the island for driving the compressor and having propulsive nozzles adapted to discharge rearwardly, and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight, and means for injecting and burning fuel in the main duct downstream from the opening when the island is in the last named position.

12. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high temperature propulsive gas stream comprising a compressor operating in the island duct, and afterburner means in the island duct downstream from the compressor, at least one gas turbine powerplant on the island for driving the compressor, means for bleeding compressed air from the island duct to said powerplant to supercharge the same, and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight.

13. An aircraft comprising an aircraft body having a main propulsive duct extending through it in the fore and aft direction and having a vertical opening intersecting the duct and extending between the upper and lower sides of the body, a ram inlet at the forward end of the main duct, a propulsive nozzle at the aft end of the main duct, an island pivotally supported in the opening and having a through duct adapted to register with the main duct, means in the island duct for compressing the air flowing therethrough and for supplying heat energy to the compressed air to create a high velocity high temperature propulsive gas stream, said means including a compressor operable in the island duct, and afterburner means downstream from the compressor, power plant means, the body remote from the propulsive duct for driving the compressor and having propulsive discharge nozzles, and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight.

14. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high temperature propulsive gas stream, said means including a compressor operable in the island duct, and afterburner means downstream from the compressor, turbo-jet engines on the outboard extremities of the body for driving the compressor and having propulsive discharge nozzles, means for bleeding compressed air from the compressor to said engines to supercharge the same, and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight.

15. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, a compressor in the island duct for compressing the air flowing therethrough to create a high velocity propulsive stream, turbo-jet engines on the outboard extremities of the body for driving the compressor and having propulsive discharge nozzles, means for operating the engines to provide differential thrusts to effect directional control of the craft and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight, and means for injecting and burning fuel in the main duct downstream from the opening when the island is in the last named position.

16. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high temperature propulsive gas stream, said means including a compressor operable in the island duct and afterburner means downstream from the compressor, means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle to propel the craft forwardly, said nozzle including vane means movable to direct the discharging jet upwardly and downwardly to obtain pitch control, turbo-jet engines on the outboard regions of the body for driving the compressor and having propulsive discharge nozzles, and means for operating the engines at differential thrusts to produce directional control of the craft.

17. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high temperature propulsive gas stream, said means including a compressor operable in the island duct and afterburner means downstream from the compressor, means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle to propel the craft forwardly, said nozzle including vane means movable to direct the discharging jet upwardly and downwardly to obtain pitch control, turbo-jet engines on the outboard regions of the body for driving the compressor and having propulsive discharge nozzles directed aft, the engines being turnable about an axis extending spanwise of the body to change the direction of their nozzles, means for turning the engines to alter the positions of the engine nozzles, and means for operating the engines at differential thrusts to obtain direction control of the craft.

18. In a vertical rising aircraft, an aircraft body having a propulsive main duct extending fore and aft therethrough and having a vertical opening intersecting the duct, an island in the opening having a duct adapted to register with the main duct, means supporting the island on the body for movement in said opening about a spanwise axis between a first position where the island duct is aligned with the main duct and a second position where the island duct is vertical, a ram inlet for the forward end of the main duct, a propulsive nozzle for the aft end of the main duct, means in the island duct for producing a propulsive stream of air and gases in the ducts for discharge from the lower end of the island when the island is in said second position and to discharge from said nozzle to constitute a propulsive jet when the island is in said first position, and power producing means external of said main and island ducts for driving the last named means.

19. In a vertical rising aircraft, an aircraft body having a propulsive main duct extending fore and aft therethrough and having a vertical opening intersecting the duct, an island in the opening having a duct adapted to register with the main duct, means supporting the island on the body for movement in the opening about a spanwise axis between a first position where the island duct is aligned with the main duct and a second position where the island duct is vertical, a variable area ram inlet for the forward end of the main duct, means responsive to aerodynamic conditions in the ram inlet for varying the area of the same, a propulsive nozzle for the aft end of the main duct, means in the island duct for producing a propulsive stream of air and gases in the island duct for discharge from the lower end of the island when the island is in said second position and to discharge from said nozzle to constitute a propulsive jet when the island is in said first position, and power producing means external of said main and island ducts for driving the last named means.

20. In a vertical rising aircraft, an aircraft body having a propulsive main duct extending fore and aft therethrough and having a vertical opening intersecting the duct, an island in the opening having a duct adapted to register with the main duct, means supporting the island on the body for movement about a spanwise axis between a first position where the island duct is aligned with the main duct and a second position where the island duct is vertical, a ram inlet for the forward end of the main duct, a variable area propulsive nozzle for the aft end of the main duct, means responsive to the position of the marginal shock waves of the stream discharging from the nozzle for varying the area of the nozzle, means in the island duct for producing a propulsive stream of air and gases in the ducts for discharge from the lower end of the island when the island is in said second position and to discharge from said nozzle to constitute a propulsive jet when the island is in said first position, and power producing means external of said main and island ducts for driving the last named means.

21. An aircraft comprising an aircraft body having a main propulsive duct extending therethrough in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high temperature propulsive gas stream comprising at least one turbo engine in the island, propulsive nozzles at the outboard regions of the body, ducts bleeding compressed air from said means to said nozzles for discharge therefrom, fuel burning means at said nozzles for adding heat energy to the air discharged therefrom, and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight.

22. An aircraft comprising an aircraft body having a main propulsive duct extending therethrough in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high temperature propulsive gas stream comprising at least one turbo engine in the island, propulsive directional control nozzles movably mounted at outboard regions of the body, ducts bleeding compressed air from said means to said nozzles for discharge therefrom, fuel burning means at the nozzles for adding heat energy to the air discharging therefrom, and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flights.

23. In a vertical rising aircraft, an aircraft body having a propulsive main duct extending fore and aft therethrough and having a vertical opening intersecting the duct, an island in the opening having a duct adapted to register with the main duct, means supporting the island on the body for movement about a spanwise axis between a first position where the island duct is aligned with the main duct and a second position where the island duct is vertical, including tubular trunnions, a propulsive nozzle at the aft end of the main duct, propulsion means in the island for adding propulsive energy to the air stream flowing therethrough to exert a lifting force when the island is in the second position and a propelling jet at the nozzle when the island is in the first position, outboard propulsive nozzles on the body, and means including said tubular trunnions for bleeding compressed air from the island to said nozzles for discharge therefrom.

24. An aircraft comprising an aircraft body having a main propulsive duct extending through it in the fore and aft direction and having a vertical opening intersecting the duct, a ram inlet at the forward end of the main duct, a propulsive nozzle at the aft end of the main duct, an island pivotally supported in the opening and having a duct adapted to register with the main duct, means in the island duct for compressing the air flowing therethrough and for supplying heat energy to the compressed air to create a high velocity high temperature propulsive gas stream comprising a plurality of turbo engines in the island duct and compressor means in the island duct driven by said engines, and means for pivoting the island to a vertical position where the island duct discharges said stream downwardly from the underside of the body to exert a lifting thrust to lift the body vertically and then to a position where the island duct discharges said stream rearwardly through the main duct to discharge from the nozzle and provide a forward thrust for translational flight.

25. In a vertical rising aircraft, an aircraft body having a propulsive main duct extending fore and aft therethrough and having a vertical opening intersecting the duct, an island in the opening having a duct adapted to register with the main duct, means supporting the island on the body for movement about a spanwise axis between a first position where the island duct is aligned with the main duct and a second position where the island duct is vertical, a propulsive nozzle at the aft end of the main duct including a plurality of pivoted vanes, and means responsive to the positions of the jet stream for moving the vanes between positions where they define a rearwardly convergent passage for subsonic flow operations and positions where they define a rearwardly convergent-divergent passage for supersonic flow operations, and propulsive means in the island for producing a propulsive stream of air and gases through the island duct to exert a lifting force when the island is in the second position and to provide a propelling jet discharging from the nozzle when the island is in the first position.

26. In a vertical rising aircraft, an aircraft body having a propulsive main duct extending fore and aft therethrough and having a vertical opening intersecting the duct, an island in the opening having a duct adapted to register with the main duct, means supporting the island on the body for movement about a spanwise axis between a first position where the island duct is aligned with the main duct and a second position where the island duct is vertical, a propulsive nozzle at the aft end of the main duct including a plurality of pivotal vanes, at least one vane being hollow and having a discharge opening facing aft, and means for pivoting the vanes to vary the effective area of the nozzle, means for bleeding compressed air from the island to said hollow vane for discharge from said opening thereof to provide a pitch-trimming jet, and propulsive means in the island for producing a propulsive stream of air and gases through the island duct to exert a propelling jet discharging from the nozzle when the island is in the first position.

27. In a vertical rising aircraft, an aircraft body having a propulsive main duct extending fore and aft therethrough and having a vertical opening intersecting the duct, an island in the opening having a duct adapted to register with the main duct, means supporting the island on the body for movement about a spanwise axis between a first position where the island duct is aligned with the main duct and a second position where the island duct is vertical, a propulsive nozzle at the aft end of the main duct including a plurality of pivoted vanes, means for pivoting the vanes to define a rearwardly convergent passage for subsonic propulsive flow and a rearwardly convergent passage for supersonic propulsive jet flow, and means for moving the vanes to positions where they project into the slip stream around the body to act as air brakes.

28. In a vertical rising aircraft, an aircraft body having a propulsive main duct extending fore and aft therethrough and having a vertical opening intersecting the duct, an island in the opening having a duct adapted to register with the main duct, means supporting the island on the body for movement about a spanwise axis between a first position where the island duct is aligned with the main duct and a second position where the island duct is vertical, a propulsive nozzle at the aft end of the main duct including a plurality of pivoted vanes, means for pivoting the vanes to define a rearwardly convergent passage for subsonic propulsive flow and a rearwardly convergent-divergent passage for supersonic propulsive jet flow, means responsive to the positions of the margins of the jet streams leaving the vanes for controlling the vane pivoting means, and means responsive to the velocity of the relative air flow past the body operable to control the vane pivoting means to project the vanes into the slip stream to serve as air brakes.

29. An aircraft including a body having a fore and aft propulsive duct and a vertical opening intersecting the duct, an island in the opening having a passage, means for supporting the island for movement between a first position where the passage registers with the duct and a second position where the passage is vertical and discharges from the underside of the body, a compressor in the passage, fuel injecting means in the passage downstream from the compressor, turbo powerplants for driving the compressor and having fuel combustors, a fuel system for supplying fuel to the injecting means and combustors, and programming means controlling said system to supply fuel to the injecting means and combustors when the island is in the first position to effect vertical ascent and when the island is in the second position to accelerate to near sonic speeds and to reduce fuel flow to the combustors to bring the powerplants to idling speeds when the craft is operating at supersonic speeds.

References Cited in the file of this patent

UNITED STATES PATENTS

| | | |
|---|---|---|
| 1,585,281 | Craddock | May 18, 1926 |
| 1,957,896 | Marguglio | May 8, 1934 |
| 2,316,751 | Adler | Apr. 20, 1943 |
| 2,374,075 | Bunevich | Apr. 17, 1945 |
| 2,384,296 | Gluhareff | Sept. 4, 1945 |
| 2,402,358 | Bauman | June 18, 1946 |
| 2,463,352 | Broluska | Mar. 1, 1949 |
| 2,479,991 | Wood | Aug. 23, 1949 |
| 2,481,600 | Knox | Sept. 13, 1949 |
| 2,540,594 | Price | Feb. 6, 1951 |
| 2,552,359 | Winslow | May 8, 1951 |
| 2,623,721 | Harrington | Dec. 30, 1952 |
| 2,632,295 | Price | Mar. 24, 1953 |
| 2,634,578 | Kallal | Apr. 14, 1953 |
| 2,637,513 | Wallen | May 5, 1953 |
| 2,644,315 | Jamieson | July 7, 1953 |
| 2,677,931 | Prieto | May 11, 1954 |

FOREIGN PATENTS

| | | |
|---|---|---|
| 607,686 | Great Britain | Sept. 3, 1948 |